United States Patent
Li et al.

(10) Patent No.: US 7,851,580 B2
(45) Date of Patent: Dec. 14, 2010

(54) POLYMER ELECTROLYTE MEMBRANES (PEMS) BASED ON IMIDAZOLE RING TERMINATED FLEXIBLE BRANCHES GRAFTED ON HYBRID INORGANIC-ORGANIC POLYMERS

(75) Inventors: Siwen Li, Atlanta, GA (US); Meilin Liu, Alpharetta, GA (US); Qunhui Sun, Kennesaw, GA (US); Wen Li, Ann Arbor, MI (US)

(73) Assignees: Toyota Motor Engineering & Manufacturing North America, Inc., Erlanger, KY (US); Georgia Tech Research Corporation, Atlanta, GA (US)

( * ) Notice: Subject to any disclaimer, the term of this patent is extended or adjusted under 35 U.S.C. 154(b) by 1009 days.

(21) Appl. No.: 10/558,521

(22) PCT Filed: May 28, 2004

(86) PCT No.: PCT/US2004/016897

§ 371 (c)(1),
(2), (4) Date: Dec. 18, 2006

(87) PCT Pub. No.: WO2004/107477

PCT Pub. Date: Dec. 9, 2004

(65) Prior Publication Data

US 2007/0099035 A1    May 3, 2007

Related U.S. Application Data

(60) Provisional application No. 60/473,957, filed on May 28, 2003.

(51) Int. Cl.
*C08G 77/28*    (2006.01)
*C08G 77/26*    (2006.01)
(52) U.S. Cl. ............... 528/30; 528/38; 556/407; 556/428; 429/33

(58) Field of Classification Search ............ 528/30, 528/38; 556/407, 428; 429/33
See application file for complete search history.

(56) References Cited

U.S. PATENT DOCUMENTS 4,623,740 A * 11/1986 Deschler et al. ............ 556/421

(Continued)

*Primary Examiner*—Margaret G Moore
(74) *Attorney, Agent, or Firm*—Gifford, Krass, Sprinkle, Anderson & Citkowski, P.C.

(57) ABSTRACT

A composition of matter comprises a polymer network, including silicon atoms and oxygen atoms, a first organic side-chain attached to at least some silicon atoms within the polymer network comprising a flexible linking group and a terminal group, the terminal group including at least one atom providing a lone pair of electrons. The composition of matter can be used to form a proton-conducting membrane. In illustrative examples, the polymer network can be an organic-inorganic hybrid network and the terminal group can includes a nitrogen-containing heterocycle.

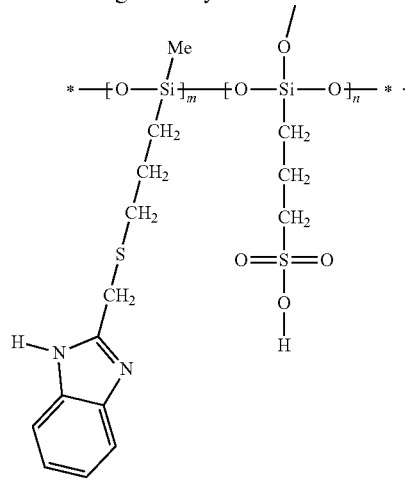

36 Claims, 12 Drawing Sheets

U.S. PATENT DOCUMENTS 5,283,310 A * 2/1994 Armand et al. ............... 528/30
6,310,110 B1 * 10/2001 Markowitz et al. ............ 521/99
6,531,539 B2 * 3/2003 Krafczyk et al. ............ 524/588
6,713,643 B2 * 3/2004 Pinnavaia et al. ........... 556/450

* cited by examiner

POLYMER ELECTROLYTE MEMBRANES (PEMS) BASED ON IMIDAZOLE RING TERMINATED FLEXIBLE BRANCHES GRAFTED ON HYBRID INORGANIC-ORGANIC POLYMERS

REFERENCE TO RELATED APPLICATION

This application claims priority to U.S. provisional patent application Ser. No. 60/473,957 filed May 28, 2003, the entire contents of which are incorporated herein by reference.

FIELD OF THE INVENTION

The present invention relates to proton conducting materials, in particular to proton electrolyte membranes (PEMs) for fuel cells.

BACKGROUND OF THE INVENTION

Proton electrolyte membranes (PEMs) are a critical component in fuel cells, reforming/partial oxidation of hydrocarbon fuels, hydrogen separation/purification, contaminant removal, gas sensing, and other processes relevant to energy storage and conversion. Membranes with high proton conductivity (>0.01 S/cm) but with little or no dependence on humidity in the temperature range of 100 to 200° C. are critical to a new generation of PEM fuel cells with much higher energy efficiency and tolerance of anode catalyst to carbon monoxide poisoning.

However, the conventional perfluorosulfonic-polymers, such as Nafion, suffer the serious disadvantages including poor proton conductivity in low humidity and at higher temperature range, dimensional changes in different humidity, fuel crossover, high cost and poor hydrophilicity.

Among all proton conducting membranes developed in recent years, polybenzimidazole (PBI)—$H_3PO_4$ membranes have the best performance. PBI—$H_3PO_4$ membranes have high proton conductivity (>$10^{-2}$ S/cm in atmosphere with 10% relative humidity) above 150° C., good mechanical properties and high thermal stability (J Electrochem Soc 1995, Vol. 142, p. L121). However, PBI—$H_3PO_4$ membranes have been reported to have very low proton conductivity in anhydrous state (less than $1\times10^{-4}$ S/cm below 160° C.) (Solid State Ion. 2002, vol. 147, p. 181 and Prog. Polym. Sci. 2000, vol. 25, p. 1463). Their proton conductivity is water dependent, too, so their application in electrochemical devices is limited. For example, they can be used as PEM electrolyte in fuel cells only when the fuel cell can produce a large amount of water in the operation. In addition, $H_3PO_4$ can leach out easily from such pure organic polymer membranes, especially when $H_3PO_4$ content is high. Also, when the content of $H_3PO_4$ is too high, the mechanical properties are degraded.

Accordingly, the development of novel electrolyte membranes with high proton conductivity in low humidity, dense structure, and good mechanical properties is still the key to the successful development of high temperature PEM fuel cells and other electrochemical devices.

Conventional materials are described in U.S. Pat. App. Pub. No. 2003/0144450, to Jacob et al., Int. Pat. App. Nos. WO01/83092 and WO01/84657 to Kerres, and U.S. Pat. No. 5,283,310 to Armand et al., U.S. Pat. No. 6,214,060 to Akita et al., and U.S. Pat. No. 6,264,857 to Kreuer et al.

SUMMARY OF THE INVENTION

A composition of matter comprises a polymer network, including silicon atoms and oxygen atoms, a first organic side-chain attached to at least some silicon atoms within the polymer network comprising a flexible linking group and a terminal group, the terminal group including at least one atom providing a lone pair of electrons. The composition of matter can be used to form a proton-conducting membrane. In illustrative examples, the polymer network can be an organic-inorganic hybrid network and the terminal group can includes a nitrogen-containing heterocycle.

DETAILED DESCRIPTION

Novel proton conducting membranes were fabricated using a simple sol-gel process. Imidazole rings are attached to flexible branches grafted on an organic-inorganic copolymer network, allowing the imidazole rings to have high degree of local motion. The inorganic Si—O—Si network can absorb significant amount of $H_3PO_4$ in the membranes. The membranes have excellent proton transport characteristics.

In one approach, silane precursors were synthesized, in which a terminal group was flexibly connected to a silane group through a flexible linking group.

Synthesis of Precursors

Alkoxysilanes derivatives terminated with imidazole rings were synthesized. Imidazole rings were attached to alkoxysilanes through a simple nucleophilic substitution reaction as described in the literature, e.g. T. Hamaguchi et al., Bioorg. Med. Chem. Lett., 10, 2657 (2000); U.S. Pat. No. 5,091,415 to J. F. Patoiseau et al.

A nucleophilic substitution reaction can take place between alkoxysilyl- and imidazole-ring-containing chemicals with —SH and —X (X=Cl, Br, and I) active groups, respectively. The reaction can take place from room temperature to 90° C. using KOH, $CH_3CH_2OK$, or $K_2CO_3$ as catalyst.

The precursors can be synthesized from commercially available chemicals through a simple nucleophilic additive reaction or nucleophilic substitution reaction. A number of illustrative examples are given below.

Example 1a

Synthesis of 2-trimethoxysilylpropylthiomethyl-1H-benzimidazole

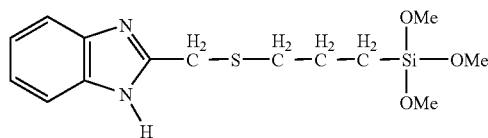

0.01 mole 2-(chloromethyl)benzimidazole was dissolved in 25 ml of methanol by stirring in a 3-neck flask with a condenser and a Ar gas line. 0.01 mole 3-mercaptopropyltrimethoxysilane was added to the solution, stirred for 10 minutes, and then 0.01 mole KOH dissolved in 10 ml methanol was added dropwise. After the reaction was completed in 12 hours at room temperature under the protection of Ar, solution was filtrated, and the white precipitate KCl was removed. After the solvent ethanol was evaporated from the filtrate in vacuum, brown viscous liquid material 2-trimethoxysilylpropylthiomethyl-1H-benzimidazole was obtained. FTIR of the obtained material shows that the characteristic peaks of aromatic ring-$CH_2$—Cl at 640 $cm^{-1}$ and 933 $cm^{-1}$ disappeared and the peak of —$CH_2$—S— at 596 $cm^{-1}$ and that of C—S—C at 696 $cm^{-1}$ appeared.

Example 1b

Figure 1:
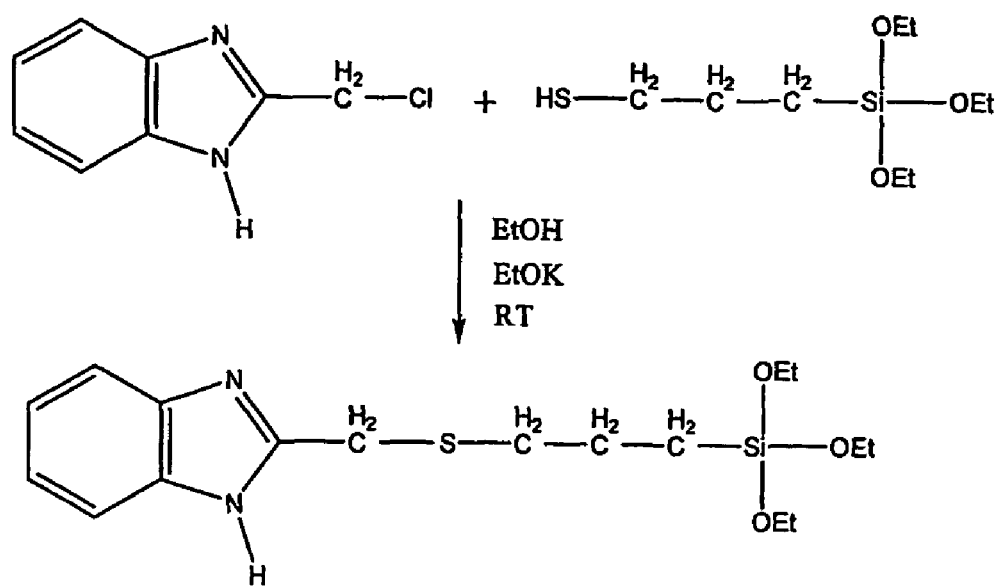
FIG. 1 shows a synthetic scheme for the synthesis of 2-triethoxysilylpropylthiomethyl-1H-benzimidazole (BISSi)

FIG. 1 further illustrates a scheme used to synthesize 2-triethoxysilylpropylthiomethyl-1H-benzimidazole (BISSi, triethoxy analog of example 1a)

1.9634 g 3-mercaptopropyltrimethoxysilane (10 mmle) was dissolved in 10 ml of anhydrous ethanol, mixed with 0.84 g of potassium ethoxide (10 mmole, 24% solution in ethyl alcohol), and then stirred for 10 minutes. 1.6661 g of 2-(chloromethyl)benzimidazole (10 mmole) in 20 ml was added dropwise to the above mixture and stirred for about 12 hours. TLC was used to check if the reaction has been completed. The white precipitate KCl was removed by filtration. About 2.2 g of 2-triethoxysilylpropylthiomethyl-1H-benzimidazole was separated from the filtrate through a silicate gel column chromatography eluted with ethyl acetate and hexane (50/50 in volume) (60% yield). It was a yellow oil-like liquid. $^1$H-NMR in $CDCl_3$: δ=10.80 (1H, brs), 7.17-7.66 (4H, m), 3.95 (2H, s), 3.75 (6H, m), 2.50 (2H, t, $J_{H-H}$=7.30), 1.65 (2H, m), 1.54 (9H, t, $J_{H-H}$=7.01), 0.65 (2H, t, $J_{H-H}$=8.18).

Example 2a

Synthesis of 2-[(p-2-trimethoxysilylethylphenylmethyl)thio]-1H-imidazole (ImSSi)

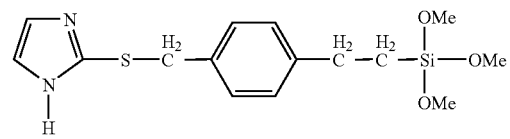

2-[(p-trimethoxysilylethylphenylmethyl)thio]-1H-imidazole (InSSi) was synthesized from 2-mercaptoimidazole and ((chloromethyl)phenylethyl)-trimethoxysilane using a similar method to that described above in Example 1a.

0.01 mole 2-mercaptoimidazole was dissolved in 25 ml of methanol by stirring in a 3-neck flask with a condenser and a Ar gas line. 0.01 mole ((chloromethyl)phenylethyl)-trimethoxysilane was added to the solution, stirred for 10 minutes, and then 0.01 mole KOH dissolved in 10 ml methanol was added dropwise. After the reaction was completed in 12 hours at room temperature under the protection of Ar, the solution was filtrated, and the white precipitate KCl was removed. The solvent methanol was evaporated from the filtrate in vacuum.

The obtained ImSSi was a light yellow viscous liquid. FTIR of the hydrolyzed and condensed solids from BISSi (as prepared using Example 1a) and ImSSi with KBr showed that the characteristic peaks of —$CH_2$—Cl at 640 $cm^{-1}$ of the reagents disappeared, and the peaks of —$CH_2$—S—$CH_2$— in BiSSi at 693 $cm^{-1}$ and —S—$CH_2$— group in ImSSi at 596 $cm^{-1}$ were observed, indicating that imidazole rings were attached on alkoxysilane through S—C bonds.

Example 2b

Figure 2:
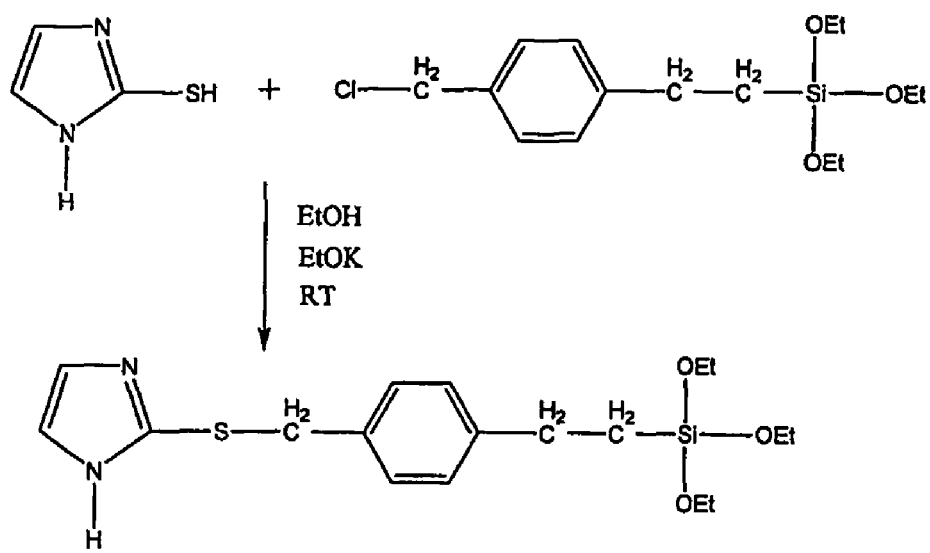
FIG. 2 shows a synthetic scheme for the synthesis of 2-[(p-2-triethoxysilylethylene-phenylenemethyl)thio]-1H-imidazole (ImSSi)

FIG. 2 further illustrates a scheme used to synthesize 1.2 2-[(p-triethoxysilylethylphenylmethyl)thio]-1H-imidazole (ImSSi, triethoxy analog of example 2a)

ImSSi was synthesized from 2-mercaptoimidazole and ((chloromethyl)phenylethyl)-trimethoxysilane with the same method as described above. 1.0001 g of 2-mercaptoimidazole (10 mmole) was dissolved in 20 ml anhydrous ethanol and mixed with 0.84 g of potassium ethoxide (10 mmole, 24% solution in ethyl alcohol), and then stirred for 10 minutes. 2.7482 g of ((chloromethyl)phenylethyl)-triethoxysilane (10 mmole) was added dropwise to the mixture, and then stirred for 6 hours. The white precipitate KCl was removed by filtration. About 2.4 g of ImSSi was separated from the filtrate through a silicate gel column chromatography eluted with ethyl acetate and hexane (50/50 in volume) (yield 65%). It is a colorless viscous liquid. $^1$H-NMR in DMSO-d$^6$: δ=12.20 (1H, bs), 7.11 (6H, m), 4.17 (2H, s), 3.76 (6H, m), 2.56 (2H, m), 1.15 (9H, t, $J_{H-H}$=6.95), 0.84 (2H, m).

Example 3

Figure 3:
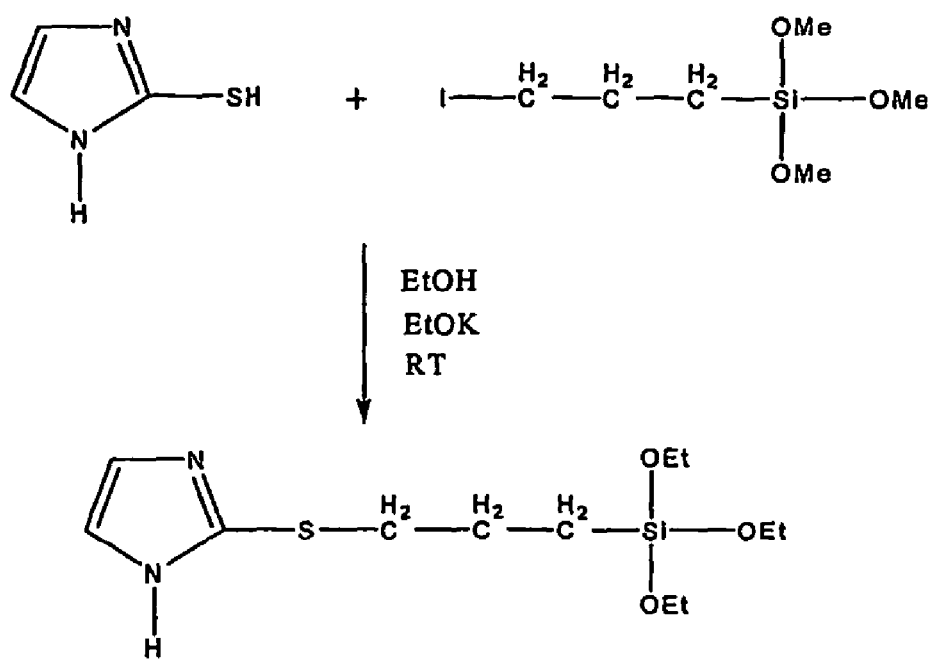
FIG. 3 shows a synthetic scheme for the synthesis of 2-((3-triethoxysilylpropyl)thio)-1H-imidazole (ImSSib)

FIG. 3 illustrates a scheme used to synthesize 2-((3-triethoxysilylpropyl)thio)-1H-imidazole (ImSSib)

ImSSib was synthesized from 2-mercaptoimidazole and 3-iodopropyl trieethoxysilane with the same method. 1.0001 g of 2-mercaptoimidazole (10 mmole) was dissolved in 20 ml anhydrous ethanol and mixed with 0.84 g of potassium ethoxide (10 mmole, 24% solution in ethyl alcohol), and then stirred for 10 minutes. 2.9017 g of 3-iodopropyltriethoxysilane (10 mmole) was added dropwise to the mixture, and then stirred for 12 hours.

The white precipitate KI was removed by filtration. About 2.1 g of ImSSib was separated from the filtrate through a silicate gel column chromatography eluted with ethyl acetate and hexane (50/50 in volume) (yield 78%). It was a colorless viscous liquid. $^1$H-NMR in DMSO-d$^6$: δ=7.11 (2H, s), 3.80 (6H, m, $J_{H-H}$=6.97), 3.00 (2H, t, $J_{H-H}$=7.05), 1.73 (2H, m), 1.20 (9H, t, $J_{H-H}$=6.96), 0.76 (2H, m).

Example 4

Figure 4:
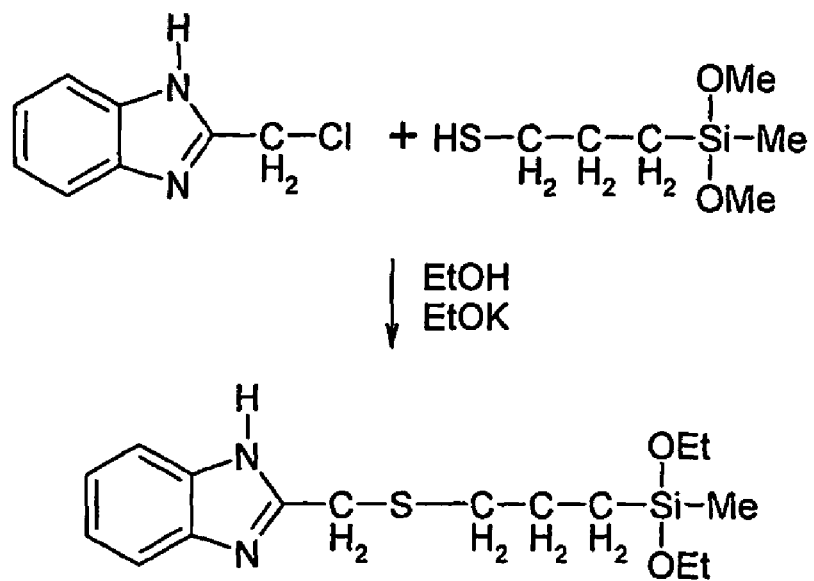
FIG. 4 shows a synthetic scheme for the synthesis of 2-methyldiethoxysilyl-propylthiomethyl-1H-benzimidazole.

FIG. 4 illustrates the scheme used to synthesize 2-methyldiethoxysilyl-propylthiomethyl-1H-benzimidazole 2-methyldiethoxysilylpropylthiomethyl-1H-benzimidazole.

The scheme shown in FIG. 4 uses a similar process to that described above in Example 1b. NMR data of precursor in DMSO-d$^6$: δ=7.55 (2H, m, Ar—H), 7.20 (2H, m, Ar—H), 3.98 (2H, s, BI—CH$_2$—S), 3.66 (4H, q, $J_{H-H}$=6.98, —O—CH$_2$—), 2.54 (2H, t, $J_{H-H}$=7.20, S—CH$_2$—), 1.57 (2H, m, —CH$_2$—), 1.14 (6H, t, $J_{H-H}$=6.98, —CH$_3$), 0.62 (2H, t, $J_{H-H}$=8.30, —CH$_2$—), 0.01 (3H, s, —CH$_3$). Yield: 65%.

Example 5

Synthesis of 2-trimethoxysilylpropylthio-1H-imidazole

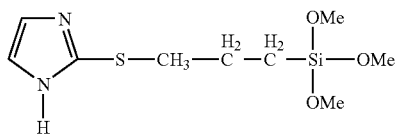

0.01 mole 2-mercaptoimidazole was dissolved in 25 ml of ethanol by stirring in a 3-neck flask with a condenser and a Ar gas line. 0.01 mole 3-chloropropyltriethoxysilane was added to the solution, stirred for 10 minutes, and then 0.01 mole KOH dissolved in 10 ml ethanol was added dropwise. The flask was put into oil bath, and the temperature was increased to 75° C. After the reaction was completed in 3 hours at 75° C. under the protection of Ar, the solution was cooled to room temperature, the solution was filtered, and the white precipitate KCl was removed. After the solvent ethanol was evaporated from the filtrate in vacuum, bright yellow viscous material 2-trimethoxysilylpropylthio-1H-imidazole was obtained.

Example 6

2-[(p-2-trimethoxysilylethylenephenylenemethyl)sulfonyl]-1H-imidazole

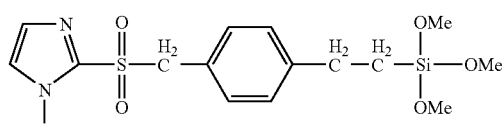

Synthesis of 2-[(p-2-trimethoxysilylethylenephenylenemethyl)sulfonyl]-1H-imidazole: 10 mmole of [(p-2-trimethoxysilylethylenephenylenemethyl)thiol]-1H-imidazole was dissolved in 20 ml of ethanol, and then the ethanol solution of 20 mmole m-chloroperbenzoic acid was added dropwise. After stirring for 6 hours, the solvent was removed in vacuum, and the white solid was extracted with ether to remove m-chlorobenzoic acid. The residual viscous solid is the product. FTIR showed that the peak of S=O group appeared at 1260 cm$^{-1}$ Other Examples of Precursors These include:
(i) 3-(triethoxysilyl)propyl 3-(1H-imidazol-2-ylthio)-2-methylpropanoate.

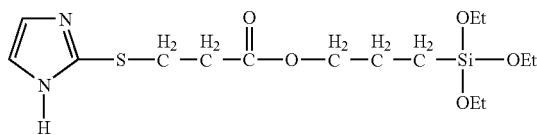

and (ii) 3-(diethoxy(methyl)silyl)propyl 3-(1H-imidazol-2-ylthio)propanoate.

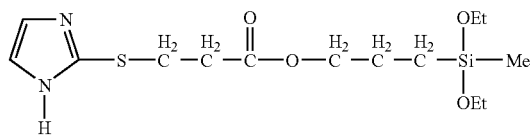

Other examples of compounds which can be used in preparation of the precursors, containing imidazole rings, include: 2-(chloromethyl)benzimidazole, 2-mercaptoimidazole, 2-mercaptobenzimidazole, 2-mercapto-5-methylbenzimidazole, 4-bromo-1H-imidazole, or 2-chlorobenzimidazole, and the like.

Other examples of alkoxysilanes having an active —X or —SH group, which can be used to synthesize the precursors, include: 3-mercaptopropylmethyldimethoxysilane, 3-mercaptopropyltriethoxysilane, 3-mercaptopropyltrimethoxysilane, 3-bromopropyltrimethoxysilane, 11-bromoundecyltrimethoxysilane, chloromethylmethyldiethoxysilane, ((chloromethyl)phenylethyl)-trimethoxysilane, (p-chloromethyl)phenyltrimethoxysilane, 3-chloropropyldimethyhnethoxysilane, 3-chloropropylmethyldimethoxysilane, 3-chloropropyltriethoxysialne, 3-chloropropyltrimethoxysilane, and 3-iodopropyltrimethoxysilane, and the like.

The nucleophilic addition reaction can take place between an —SH group of a compound also containing a heterocycle, such as one having an imidazole ring, and alkoxysilyl-containing acrylate or methacrylate. The nucleophilic addition can take place in a basic solvent. For example, a small amount of KOH can be used as a catalyst. This reaction can complete in several minutes at room temperature.

For example, a nucleophilic substitution reaction can be written in the form:

where X is a halogen. A can be an alkyloxysilane, and B a compound including a nitrogen-containing heterocycle, or vice-versa (A being a compound including a nitrogen-containing heterocycle and B being an alkyloxysilane).

Examples of —SH group containing compounds include: 2-mercaptoimidazole, 2-mercaptobenzimidazole, 2-mercapto-5-methylbenzimidazole, and derivatives thereof.

The alkoxysilyl containing acrylate or methacrylate can be (3-acryloxypropyl)dimethylmethoxysilane, (3-acryloxypropyl)methyldimethoxysilane, (3-acryloxypropyl)trinmethoxysilane, (methacryloxymethyl)dimethylethoxysilane, methacryloxymethyltriethoxysilane, methacryloxymethyltrimethoxysilane, methacryloxypropyldimethylethoxysilane, methacryloxypropyldimethylmethoxysilane, methacryloxypropylmethyldiethoxysilane, methacryloxypropylmethyldimethoxysilane, methacryloxypropyltriethoxysilane, and the like.

If a sulfur atom is directly connected to an imidazole ring (or other nitrogen-containing heterocycle), it can be oxidized to sulfonyl (—SO2-) groups via peroxide to increase the activity of a proton on the imidazole ring because the —SO2- group has a strong electron-withdrawing effect. Specific examples include 2-[(p-2-trimethoxysilylethylenephenylenemethyl)sulfonyl]-1H-imidazole and 2-[(3-methyldiethoxysilylpropyl propinyl)sulfonyl]-1H-imidazole.

Further precursor examples are illustrated below:

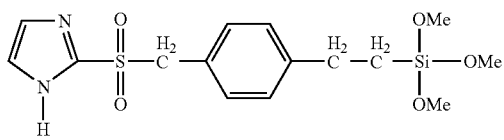

(iii) 2-[(p-2-trimethoxysilylethylenephenylenemethyl)sulfonyl]-1H-imidazole

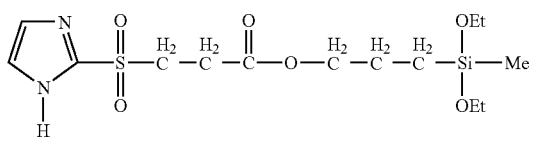

(iv) 3-(diethoxy(methyl)silyl)propyl 3-(1H-imidazol-2-ylsulfonyl)propanoate

Grafting and Hybrid Inorganic-organic Polymers

Examples of materials which can be used include: bis(3-methyldimethyoxysilyl)polypropylene oxide (MDSPPO) and alkoxysilane grafted polymer rubbers, for example poly(vinylidine fluoride-hexafluoropropylene) (PVDF-HFP)-g-trimethoxysilyl methacrylate (TSMA), poly(styrene butadiene) copolymers (SB Rubber)-g-trimethoxysilyl methacrylate (TSMA), and styrene-butadiene-styrene block copolymer (SBS)-g-trimethoxysilyl methacrylate (TSMA), and the like.

Other silane grafted polymers, such as silane-grafted thermoplastics, which can also be used in preparing improved membranes according to the present invention, are also described in U.S. Provisional Application Ser. No. 60/473,812, filed May 28, 2003, the entire contents of which are incorporated herein by reference.

Precursors described herein can be used to form polymer chains or networks for use in improved proton conducting materials.

Proton Conducting Membranes

A new series of proton conducting membranes based on hybrid inorganic-organic copolymers grafted imidazole rings as proton solvents instead of water were fabricated using a simple sol-gel process. In these membranes, imidazole rings are attached to flexible (short, organic) branches grafted on an organic-inorganic copolymer network, allowing imidazole rings to have high degree of local motion. The inorganic Si—O—Si network can absorb significant amount of $H_3PO_4$ in the membranes. Accordingly, the protons can transport through the membrane by the so-called Grotthuss-type mechanism.

Figure 5:
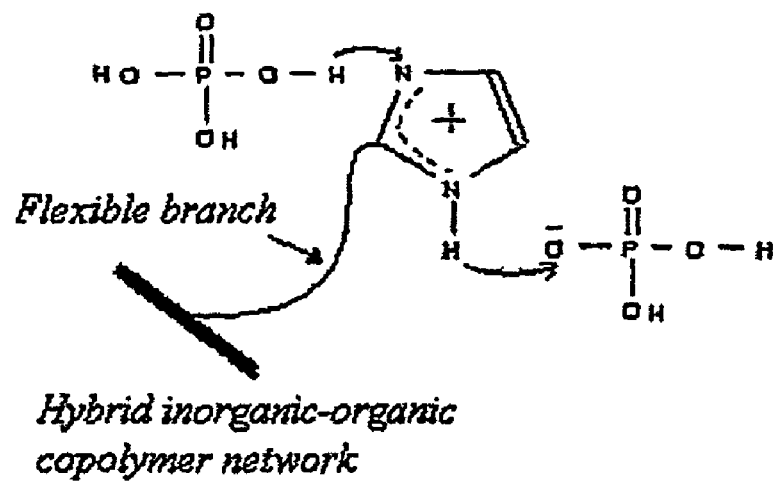
FIG. 5 shows a schematic representation of proton transport within a membrane.

FIG. 5 schematically shows the proton transport process that may occur between imidazole rings and $H_3PO_4$ molecules within a membrane. The figure shows one nitrogen atom of the heterocycle receiving a proton from $H_3PO_4$, the other nitrogen atom giving up a proton to the acid ion. The imidazole ring is flexibly attached to a network, such as an inorganic network or a hybrid inorganic-organic copolymer network.

The previous section described synthesis of precursors, examples included where imidazole rings were grafted on alkoxysilane with a simple nucleophilic substitution reaction to facilitate the preparation of hybrid inorganic-organic copolymers. Proton electrolyte membranes (PEM) based on these co-polymers and $H_3PO_4$ exhibit high proton conductivity in low relative humidity, excellent mechanical properties, and high thermal stability.

The new membranes can possess high proton conductivity in the anhydrous state, so that they have proton conductivity independent of the presence of water. Also, because of the hybrid inorganic-organic copolymer network, the new membranes can have good mechanical properties and high thermal stability. They have great potential application in fuel cells and other electrochemical devices.

It is found that the proton conductivities increase with $H_3PO_4$ content, reaching $3.2 \times 10^{-3}$ S/cm at 110° C. in a dry atmosphere for a membrane with 1 mole of imidazole ring and 7 moles of $H_3PO_4$. In an environment with relative humidity (RH) less than 20%, the proton conductivity is $4.3 \times 10^{-2}$ S/cm at 110° C. TGA analysis indicated that these membranes are thermally stable up to 250° C. in dry air, implying that they have a good potential to be used as the membranes for high-temperature PEM fuel cells.

The new membranes have high proton conductivity in the anhydrous state and in low relative humidity, high thermal stability, good mechanical properties, and good water-resistance. They have great potential as PEM electrolytes in high temperature PEM fuel cells and other electrochemical devices.

A sol-gel process was used to synthesize the new hybrid inorganic-organic copolymer proton conducting membranes. All precursors were dissolved in a conventional solvent (such as ethanol, methanol, THF, ethyl acetate, or the like) and hydrolyzed by water with acid as a catalyst. After the sols are stirred for several hours, a pre-determined amount of $H_3PO_4$ was added and further stirred for several hours. The resultant sols were then cast in Petri dishes made of polystyrene or glass, and dried oven at 60° C. for several days to form gels and evaporate solvents. The solvent evaporation rate may be controlled, as it can substantially influence the mechanical properties of the membranes.

$^{31}P$ NMR Data of Imdazole-Ring Grafted Membranes

Figure 6:
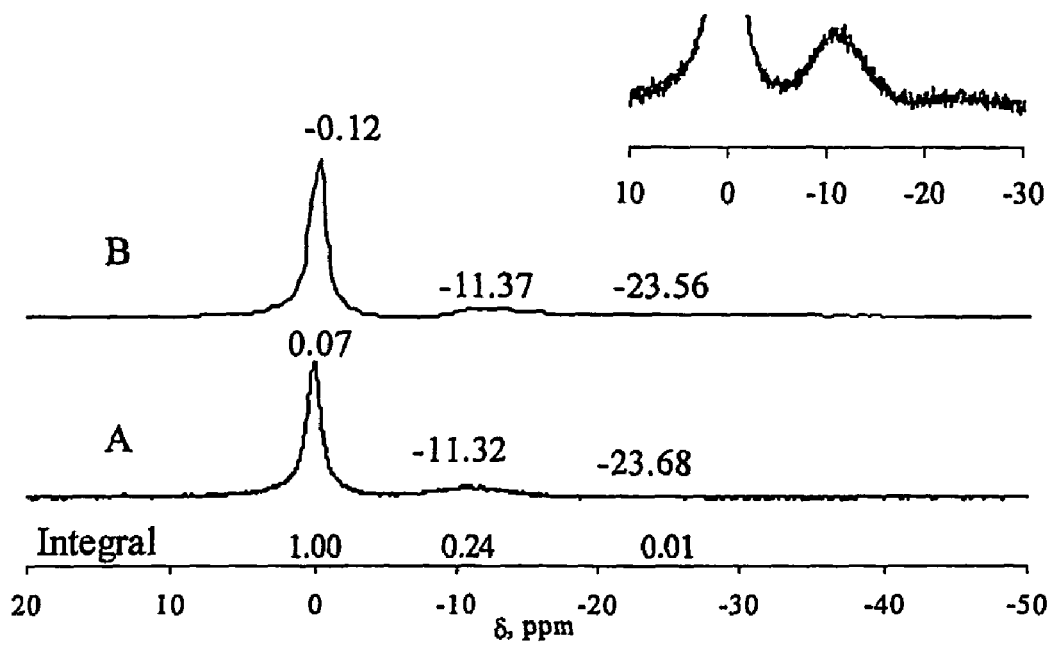
FIG. 6 shows $^{31}P$ NMR spectra of two hybrid inorganic-organic membranes with composition of (A) 2 M-3 T-1 BiSSi-3 P and (B) 2M-2Oc-1T-1ImSSi-5 P.

FIG. 6 shows $^{31}P$ NMR spectra of two hybrid inorganic-organic membranes with composition of (A) 2 M-3 T-1 BiSSi-3 P (2 M-3 T-1 BISSi-3 $H_3PO_4$) and (B) 2M-2Oc-1T-1ImSSi-5 P. The inset shows a magnified intensity spectrum to show the weak peaks near −11.3 ppm and −23.68 ppm.

Three $^{31}P$ resonance peaks were observed; one of which is too weak to be visible in the full spectrum. The main peak at $\delta=0$ ppm is attributed to the undissociated $H_3PO_4$ and other dissociated species such as $H_4PO_4^+$ and $H_2PO_4^-$. The latter two species are known to be within 2 ppm of the undissociated $H_3PO_4$ signal. The weak peaks at $\delta \approx -11$ ppm and −24 ppm are attributed to the end unit of pyrophosphoric acid and tripolyphosphoric acid. It should be mentioned that these weak peaks may be assigned to the phosphates bound to one or two silicon atoms through P—O—Si bonds, which means that $H_3PO_4$ was attached to the Si—O—Si network in the hybrid inorganic-organic copolymer. The integral of the two weak peaks is about 20% of the total $^{31}P$ resonance peaks for the membrane. This suggests that about 80% of the phosphoric acid is present in the free form, including undissociated $H_3PO_4$ and dissociated species such as $H_4PO_4^+$ and $H_2PO_4^-$.

Membranes Based on TMSPBI

Fabrication of proton conducting membranes based on hybrid inorganic-organic copolymer grafted 2-trimethoxysilylpropylthiomethyl-1H-benzimidazole (TMSPBI): the precursor solution was prepared by mixing MDSPPO (Gelest, 96%; MW 600-900), tetraethoxysilane (TEOS), and TMSPBI with ethanol. The composition can be 1 mole MDSPPO, 1 to 2 mole TEOS, and 0.5 mole TMSPBI. After stirring for 20 minutes, 0.5 N HCl aqueous solution was added dropwise to the precursor solution, and further stirred for 30 minutes. After $H_3PO_4$ was added dropwise, the solution was stirred for 1 to 3 hours to form sol. The sol was cast in Petri dishes. The membranes were dried at 60° C. for several days, at 80° C. for 3 hours, and then at 100° C. for 1 hour to evaporate the organic solvents and water. The samples were labeled by their mole composition as x M-y T-z BI-m P, where x, y, and z refers to the moles of Si in MDSPPO, TEOS, and TMSPBI, respectively, and m refers to the moles of $H_3PO_4$.

Figure 7A:
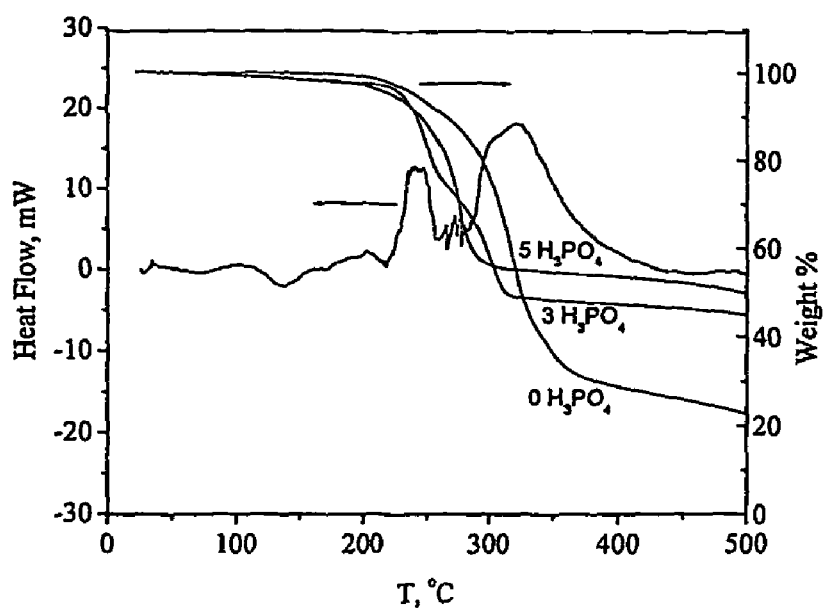
FIG. 7A shows TGA and DSC curves for three samples 2 M-3 T-1 BI-x P (x=0, and 5) as obtained in dry air (heating rate: 5° C./min)

FIG. 7A shows the TGA and DSC curves versus temperature of samples with compositions of 2 M-3 T-1 BI-x P (x=0, 3, 5, 7), indicating that the membrane is thermally stable up to 210° C.

The samples had good mechanical properties. Gels were dried in a slow procedure by decreasing the gel contact area with air. Pressure was not controlled, but pressure control could be helpful in obtaining reproducible properties.

Figure 7B:
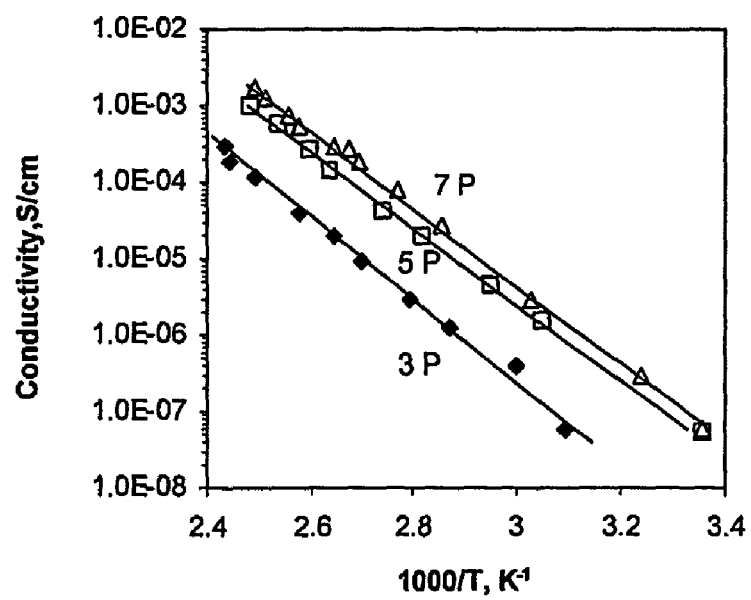
FIG. 7B shows proton conductivities of samples 2 M-3 T-1 BI-x P with x=3, 5, and 7, as obtained in dry argon.

FIG. 7B shows the proton conductivities of these samples as determined using impedance spectroscopy under anhydrous conditions. The proton conductivities at 125° C. of samples 2 M-3 T-1 BI-5 P and 2 M-3 T-1 BI-7 P are $1.0 \times 10^{-3}$ S/cm and $1.5 \times 10^{-3}$ S/cm, respectively. The proton conductivities were obtained in dry Ar after the membranes were dried in Ar at 60° C. for 5 hours and 80° for 2 hours to remove water and organic solvents.

Membranes Based on TMSPI

Fabrication of proton conducting membranes based on hybrid inorganic-organic copolymer grafted 2-[(p-trimethoxysilylethylphenylmethyl)thio]-1H-imidazole (TMSPI): The precursor solution was prepared by mixing MDSPPO (Gelest, 96%; MW 600-900), TEOS (Aldrich, 98%), and TMSPI with ethanol. The composition can be 1 mole MDSPPO, 1 to 2 mole TEOS, and 0.5 mole TMSPI. After stirring for 20 minutes, 0.5 N HCl aqueous solution was added dropwise to the precursor solution, and further stirred for 30 minutes. After $H_3PO_4$ was added dropwise, the solution was stirred for at 1 to 3 hours to form sol. The sol was cast in Petri dishes. The membranes were dried at 60° C. for several days, at 80° C. for 3 hours, and then at 100° C. for 1 hour to evaporate the organic solvents and water. The samples were labeled by their mole composition as x M-y T-z Im-m P, where x, y, and z refers to the moles of Si in MDSPPO, TEOS, and TMSPI, respectively, and m refers to the moles of $H_3PO_4$.

Figure 8A:
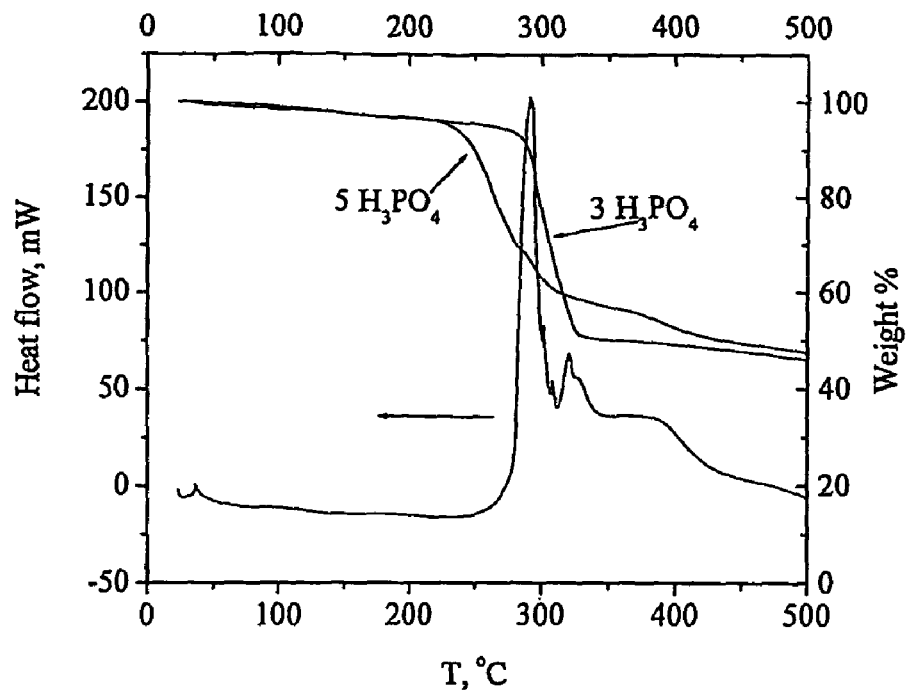
FIG. 8A shows TGA curves for two samples 2 M-3 T-1 Im-x P with x=3, and 5 as obtained in dry air (Heating rate: 5° C./min)

FIG. 8A shows the TGA curves of samples with composition of 2 M-3 T-1 Im-x P (x=3 and 5), indicating that the new membranes are thermally stable up to 250° C. Shown in FIG. 4 are the proton conductivities of the samples as measured in dry Ar. The proton conductivity of the sample with composition of 2 M-3 T-1 Im-5 P is $1.0 \times 10^{-3}$ S/cm at 125° C.

Figure 8B:
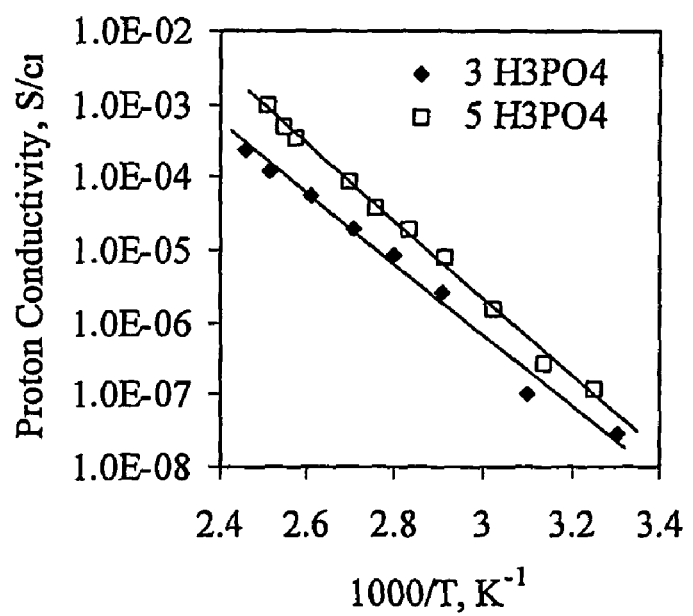
FIG. 8B shows proton conductivities of two samples 2 M-3 T-1 Im-x P with x=3, and 5 as obtained in dry argon.

FIG. 8B shows proton conductivities (S/cm) of two samples 2 M-3 T-1 Im-x P with x=3, and 5 as obtained in dry Ar after the membranes were dried in dry Ar at 60° C. for 5 hours, and 80° C. for 2 hours to remove water and organic solvents.

Membranes Based on BISSi, ImSSi, and ImSSib

The obtained BISSi, ImSSi, or ImSSib prepared as described above, was dissolved in ethanol together with bis (3-methyldimethyoxysilyl)polypropylene oxide (MDSPPO, MW 600-900), 1,4-bis(trimethoxysilylethyl)benzene (BTMSEB), bis(triethoxysilyl)octane (BTESO), and tetraethoxysilane (TEOS). After stirring for 20 minutes, 0.5 N HCl aqueous solution was added dropwise to the precursor solution, and further stirred for at least 12 hours. At last, $H_3PO_4$ was added dropwise, and the solution was stirred for another 1~2 hours to form uniform sols.

The samples were labeled by their mole composition as x M-y B (or O)-z T-m BISSi (ImSSi/ImSSib)-n P, where x, y, z, and m refer to the moles of Si in MDSPPO, BTMSEB (or BTESO), TEOS, and BISSi (or ImSSi/ImSSib), respectively, and n is the moles of $H_3PO_4$. In this study, x=2, y=0 or 2, z=3 or 1, m=1, and n=0, 3, 4, 5, 6, and 7. The membranes were dried at 60° C. for 3 days, at 80° C. for 3 hours, and then at 100° C. for 1 hour to evaporate the organic solvents and water.

Hence, the abbreviations used in labeling the compositions are M for MDSPPO (bis(3-methyldimethyoxysilyl)polypropylene oxide), B for BTMSEB (1,4-bis(trimethoxysilylethyl) benzene), T for TEOS (tetraethoxysilane), and P for phosphoric acid ($H_3PO_4$).

The proton conductivity of the hydrolyzed and condensed BISSi in anhydrous state was measured to be about $2 \times 10^{-7}$ S/cm at 80° C., and 7×10$^{-7}$ S/cm at 100° C., and that of the hydrolyzed and condensed ImSSi is 2×10$^{-7}$ S/cm at 50° C., indicating that the new materials have similar proton conducting ability to imidazole-terminated ethyleneoxides (EO). The proton conductivity originates from the proton transfer between imidazole rings with the corresponding reorganization of the hydrogen bond pattern, following a Grotthuss-type mechanism.

All the membranes with compositions of 2 M-3 T-1 BISSi (or ImSSi)-n P (n=0, 3, 5, 7) and 2 M-2 B (or O)-1 T-1 BISSi-n P (n=4, and 6) are highly flexible with good mechanical strength. Self-standing membranes with a thickness less than 0.1 mm can be cast readily with large size depending on the molds. These membranes keep un-deliquescent in ambient air for many days. Only about 30% of $H_3PO_4$ in the samples with compositions of 2 M-2 B-1 T-1 BISSi-6 P and 2 M-3 T-1 BISSi-5 P leached out after they were immersed in water at room temperature for 2 hours, and then at 70° C. for 2 hours.

The high stability of $H_3PO_4$ in the membranes can be assigned to the good affinity of Si—O network and the hydrogen bonds between $H_3PO_4$ and PEO chains introduced by MDSPPO. The interaction between imidazole rings and $H_3PO_4$ may be another reason of the high stability of $H_3PO_4$ in the membranes with grafted imidazole rings. The strong interaction between imidazole rings and $H_3PO_4$ was conformed by FTIR spectrum of the membranes with grafted benzimidazole and $H_3PO_4$ in which a strong broad peak was observed from 2500 cm$^{-1}$ to 3200 cm$^{-1}$.

X-ray diffraction spectra show that all the membranes as obtained are amorphous. After heating in dry Ar from 100° C. to 140° C. for total 6 hours, no peak observed in the XRD, indicating that no crystallization takes place between Si—O—Si network and $H_3PO_4$, as previously reported in inorganic Si—$H_3PO_4$ gels.

FTIR spectra of the membranes with $H_3PO_4$ showed the characteristic absorption of NH$^+$ groups around 2920 cm$^{-1}$, indicating that $H_3PO_4$ in the new membranes protonated the imidazole rings. This is different from conventional PBI/$H_3PO_4$ membranes where $H_3PO_4$ interacts with PBI with strong hydrogen bonds, but does not protonate imidazole groups. $^{31}$P MAS-NMR spectra of one sample with a composition of 2 M-3 T-1 BISSi-3 $H_3PO_4$ showed that about 80% of $H_3PO_4$ in the membranes exits as free forms, including undissociated $H_3PO_4$ and dissociated species (such as $H_4PO_4^+$ and $H_2PO_4^-$), and other $H_3PO_4$ was attached on Si—O—Si network through P—O—Si bonds.

Figure 9:
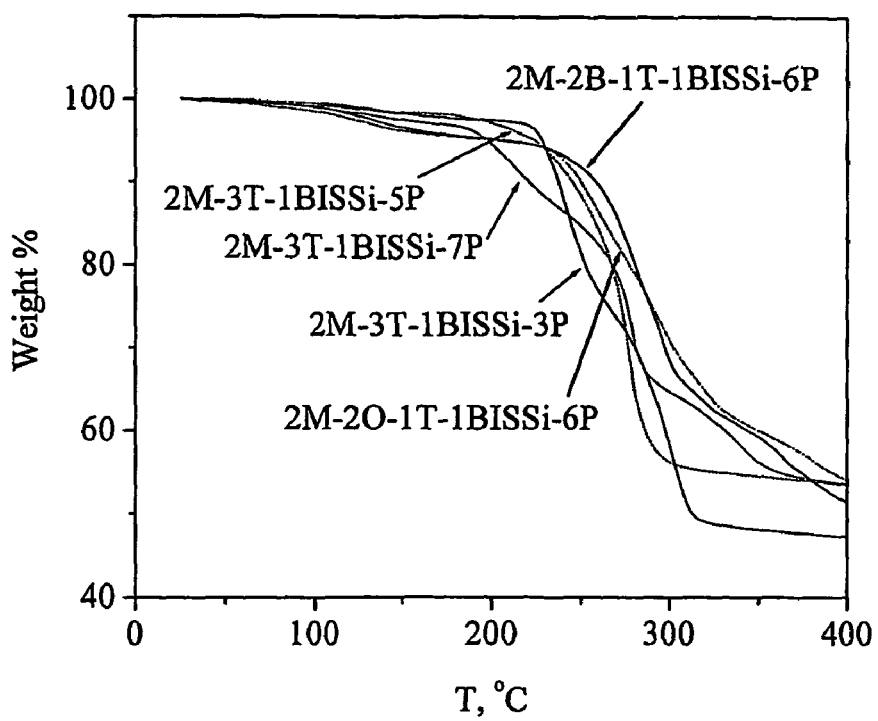
FIG. 9 shows TGA curves of several membranes measured in dry air at a heating rate of 5° C./minute.

FIG. 9 shows the TGA curves of 2 M-3 T-1 BISSi-x P (n=3, 5, and 7) and 2 M-2 B (or O)-1 T-1 BISSi-6 P from room temperature to 400° C. in dry air at a heating rate of 3° C./minute. For the membranes 2 M-3 T-1 BISSi-n P, the onset of decomposition decreases with increasing of $H_3PO_4$ contents. It is about 300° C., 230° C., 220° C., and 190° C. for the membrane with $H_3PO_4$ content n=0, 3, 5, and 7, respectively, indicating that the addition of $H_3PO_4$ reduced the thermal stability of membranes because the complexation of acid molecules to the hybrid inorganic-organic copolymer network corrode and oxidize the PPO-based polymer backbone. The thermal stability of the membranes was improved by the addition of BTMSEB and BTESO. The onset of decomposition of the membranes with BTMSEB and BTESO is at around 250° C. The benzene ring in the linking group of BISSi may enhance the thermal stability.

The proton conductivity of all the membranes in anhydrous state was measured using a Solartron 1255/1286 impedance analyzer in the frequency range of 0.01 Hz-5 MHz from room temperature (RT) to about 140° C. All the membranes were previously heated in dry Ar at 60° C. for 6 hours, 80° C. for 3 hours, and 100° C. for 2 hours to remove most of the water in the membranes. The proton conductivity data were measured after the sample was kept at that temperature for at least 2 hours to get stable in dry Ar.

Figure 10:
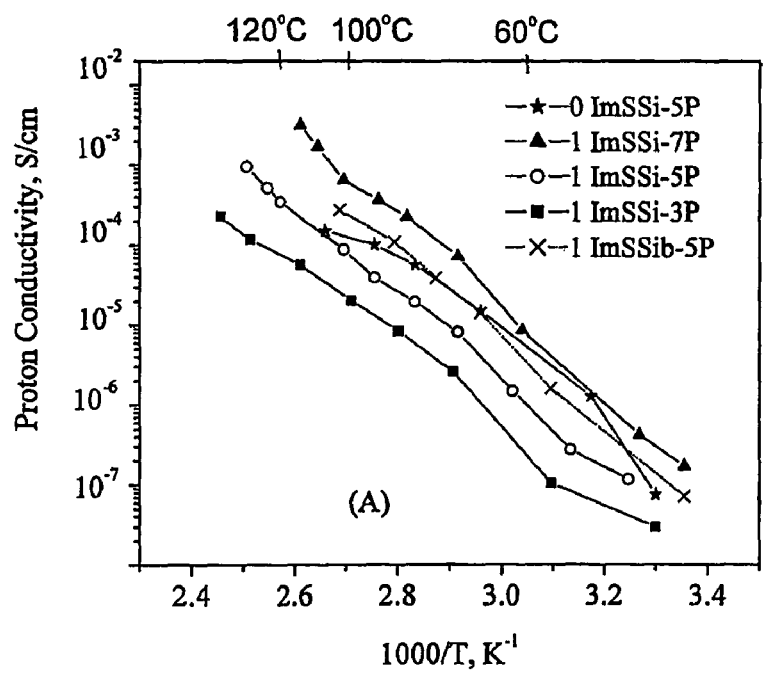
FIG. 10 shows proton conductivity of 2 M-3 T-x ImSSi (ImSSib)-y P (x=0, y=5; x=1, y=3, 5, and 7) in anhydrous state.

FIG. 10 shows the proton conductivity curves of membranes 2 M-3 T-1 BISSi (ImSSi)-x P (x=3, 5, and 7), and also an ImSSib based membrane. For all the membranes, the proton conductivity increases with temperature, reaching 10$^{-3}$ S/cm above 100° C. when $H_3PO_4$ content in the membranes is larger than 5. It is 3.2×10$^{-3}$ S/cm at 110° C. for the sample with a composition of 2 M-3 T-1 ImSSi-7 P. The proton conductivity increases with $H_3PO_4$ content, similar to conventional polymer-$H_3PO_4$ materials reported, indicating that the protons from $H_3PO_4$ self-dissociation are the main originate of the proton conductivity in the new membranes[9-13]. Compared with conventional self-standing PBI-2.9 $H_3PO_4$, the new membranes have higher proton conductivity. This can be attributed to the fact that $H_3PO_4$ in PBI membranes has a strong interaction with imidazole rings, but that in the new membranes exists mainly in free forms and protonates the imidazole rings as discussed above.

Figure 11:
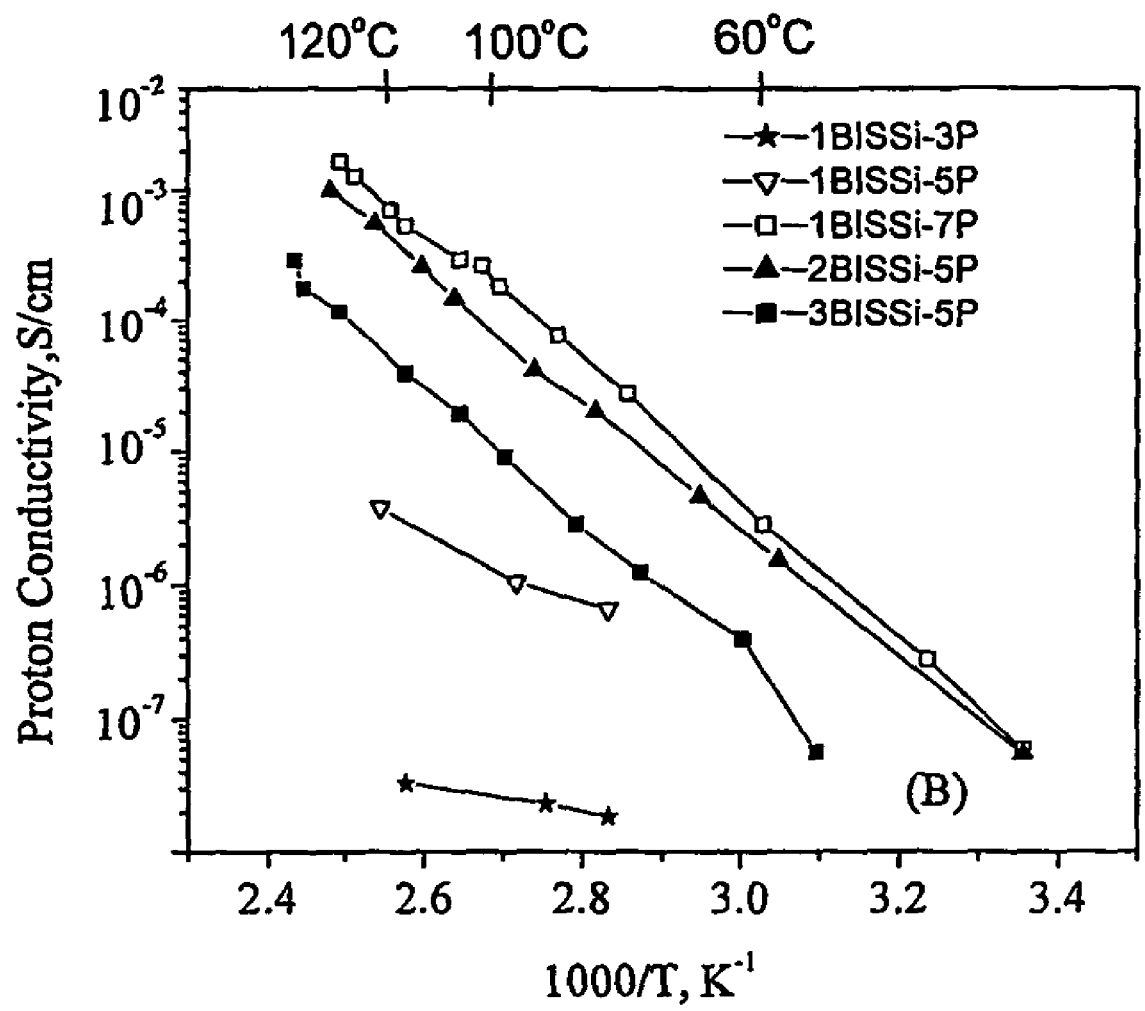
FIG. 11 shows proton conductivity of 2 M-3 T-x BISSi-y P (x=1, y=3, 5, and 7; and x=2, and 3, y=5) in anhydrous state.

FIG. 11 shows proton conductivity data for BISSi—P membranes, for various content of $H_3PO_4$. Comparing the imidazole-grafted membrane 2 M-3 T-1 ImSSi-5 P to that with a composition of 2 M-3 T-5 P, we can find that the proton conductivity of the imidazole-grafted membrane is smaller, especially in lower temperature range. With increasing benzimidazole contents, the proton conductivity of the membranes decreased (see FIG. 11). One of the possible reasons is that the local mobility of imidazole rings was pressed because of the high viscosity of the membranes as observed in PBI—$H_3PO_4$-Imidazole system. So the action of imidazole rings as vehicles for proton transport like water molecules is not large enough to improve the proton conductivity. However, because imidazole (Pka$_1$=6.9) and benzimidazole (Pka$_1$=5.3) are strong bases, $H_3PO_4$ protonated imidazole rings and formed N—H$^+$ groups. The proton transport rate between N—H$^+$ and $H_2PO_4^-$ or among N—H$^+$ groups is much lower than that between $H_3PO_4$ and $H_2PO_4^-$, and thus the proton conductivity of the membranes decreased. It is notable that the proton conductivity of the membrane with a composition of 2M-3T-1ImSSib-5P is much higher than that of membrane with a composition of 2M-3T-1ImSSi-5P. Comparing the molecule structures of ImSSi and ImSSib, we can find that the organic chains that connect imidazole rings with Si are much different. The chain in ImSSib is much softer than that in ImSSi because there is a benz-ring in the chain of ImSSi. So the local mobility of imidazole rings in the membrane with ImSSib is easier than that with ImSSi. The soft chain allows for the rapid transport of proton via structure diffusion, and so the membranes with ImSSib have higher proton conductivity.

To check the humidity sensitivity of the new membranes, several samples were kept at 70° C. to 120° C. in the vapor of saturated MgCl$_2$ aqueous solution. The calculated relative humidity in the closed chamber with saturated MgCl$_2$ aqueous solution is 26% at 70° C., about 22.5% at 100° C., and less than 15% at 120° C.[23] The samples were kept at each temperature for several hours until the measured proton conductivity values were stable.

Figure 12:
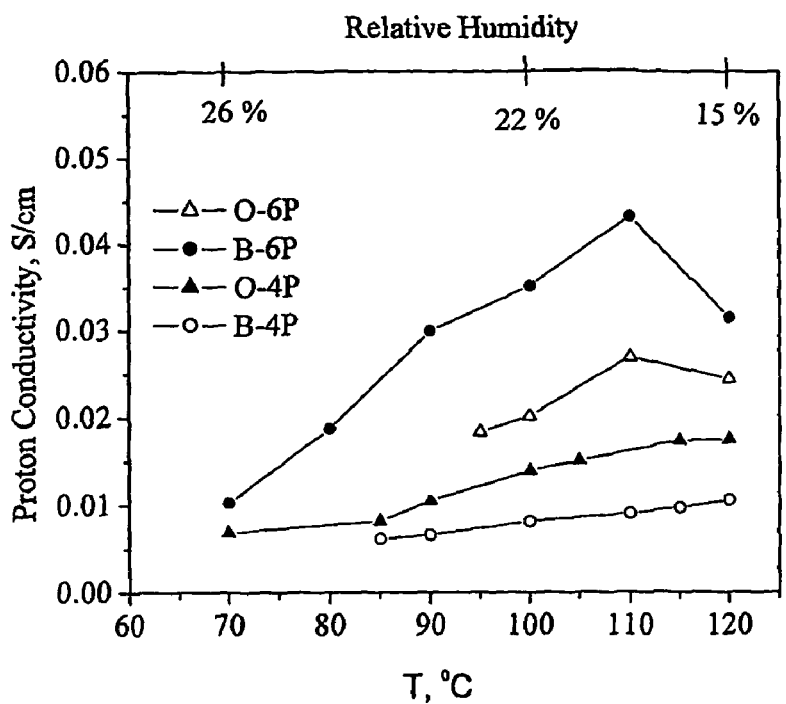
FIG. 12 shows proton conductivity stability of 2 M-2 O (or B)-1 T-1 BISSi-x P (x=4 and 6) in the vapor of saturated $MgCl_2$ aqueous solution.

FIG. 12 shows the proton conductivities of samples 2 M-2 O (or B)-1 T-1 BISSi-n P (n=4, and 6) with the calculated relative humidity. The proton conductivity of all the samples is larger than 0.01 S/cm above 100° C. It is 0.04 S/cm at 110° C. for the sample 2 M-2 O-1 T-1 BISSi-6 P. The much higher proton conductivity under wet conditions can be attributed to the higher mobility of $H_3O^+$ as a vehicle of proton. The membranes kept their mechanical properties after they were kept in the wet environments at 120° C. for more than ten hours.

Fuel Cell Test Result

Membranes according to the present invention can be used in a variety of applications. For example, the membranes can be used in improved fuel cells.

For a fuel cell test, a membrane-electrodes assembly (MEA) with the new membrane 2M-3T-1BISSi-7P as the electrolyte and the commercially available Pt-loaded carbon paper (1 mg/cm$^2$) as electrodes was obtained by hot-pressing the membrane between the electrodes at 100° C. under about 110 bar for 2 minutes.

The new hybrid inorganic-organic copolymer membranes were tested in a fuel cell using $H_2$ as fuel and $O_2$ as oxidant. The relative humidity of the inlet gases was calculated to be 2% at 100° C. and 1% at 130° C. The thickness of the membranes is about 200 μm. The fuel cell was run at atmospheric pressure.

Figure 13:
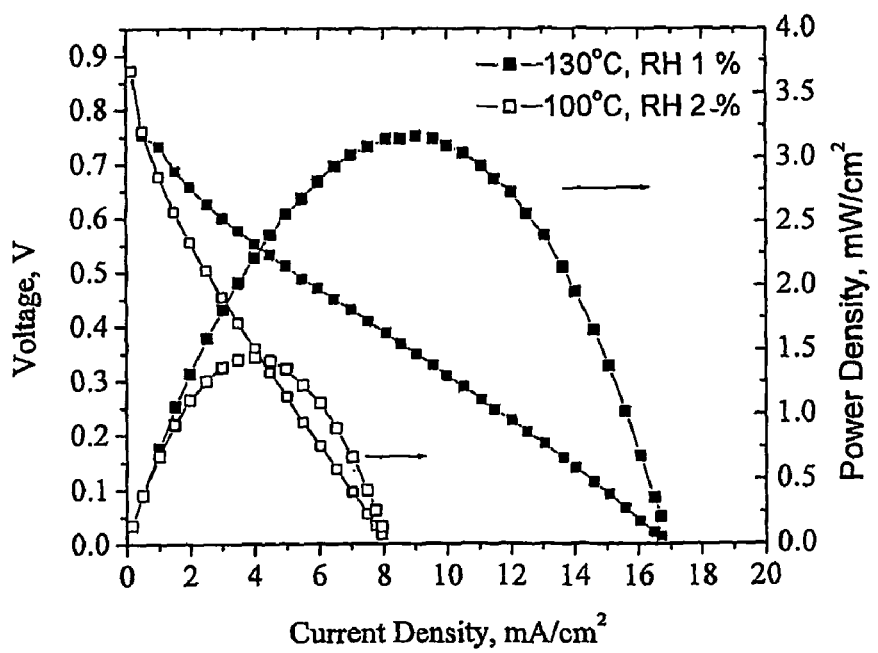
FIG. 13 shows cell voltage and power density versus current density of 2M-3T-1BISSi-7P at 100° C. and 130° C. under ambient pressure. ($H_2/O_2$ bubbled with water vapor at room temperature)

FIG. 13 shows the curves of voltage-current and power density-current at 100° C. and 130° C. with a membrane 2 M-3T-1BISSi-7 P as the electrolyte. The figure shows cell voltage and power density versus current density of 2M-3T-1BISSi-7P at 100° C. and 130° C. under ambient pressure. ($H_2/O_2$ bubbled with water vapor at room temperature).

The open-circuit voltage is about 0.9 V and the power density is 3.2 mW/cm$^2$ at 130° C. The power density is one or two orders of magnitude lower than that for fuel cells using PBI—$H_3PO_4$ as electrolyte. It was found that the interfacial resistance between the electrodes and the electrolyte is over 45 ohm·cm$^{-2}$. This is possibly one of the reasons for the poor fuel cell performance. Much higher performance is expected by optimizing the membrane-electrode-assembly (MEA) and the running conditions.

Synthesis and Membrane Fabrication using OxImSSi

This section describes synthesis of 2-[(p-2-trimethoxysi-lylethylene-phenylenemethyl)sulfonyl]-1H-imidazole (Ox-ImSSi, shown below) and fabrication of membranes with OxImSSi and $H_3PO_4$.

2-[(p-2-trimethoxysilylethylenephenylenemethyl)sulfo-nyl]-1H-imidazole
(OxImSSi)

Because of the electron-withdrawing effect of sufonyl-groups, sulfonyl-attached imidazole rings will have more acidity (more activity of H$^+$ on N atoms), and thus the membranes based on them can have higher proton conductivity. In this work, the —S— group in 2-[(p-2-trimethoxysilylethyl-enephenylenemethyl)thio]-1H-Imidazole was oxidized to —SO$_2$— group using peroxide.

2-[(p-2-trimethoxysilylethylenephenylenemethyl)thio]-1H-Imidazole was synthesized as described above in Example 2a. 10 mmole of 2-[(p-2-trimethoxysilylethyl-enephenylenemethyl)thio]-1H-Imidazole was dissolved in 20 ml of ethanol, and then the ethanol solution of 20 mmole m-chloroperbenzoic acid was added dropwise. After stirring for several hours, the solvent was removed in vacuum, and the white solid was extracted with ether to remove m-chloroben-zoic acid. The residue OxImSSi as viscous solid was dissolved in the mixture of methanol and acetone.

Figure 14:
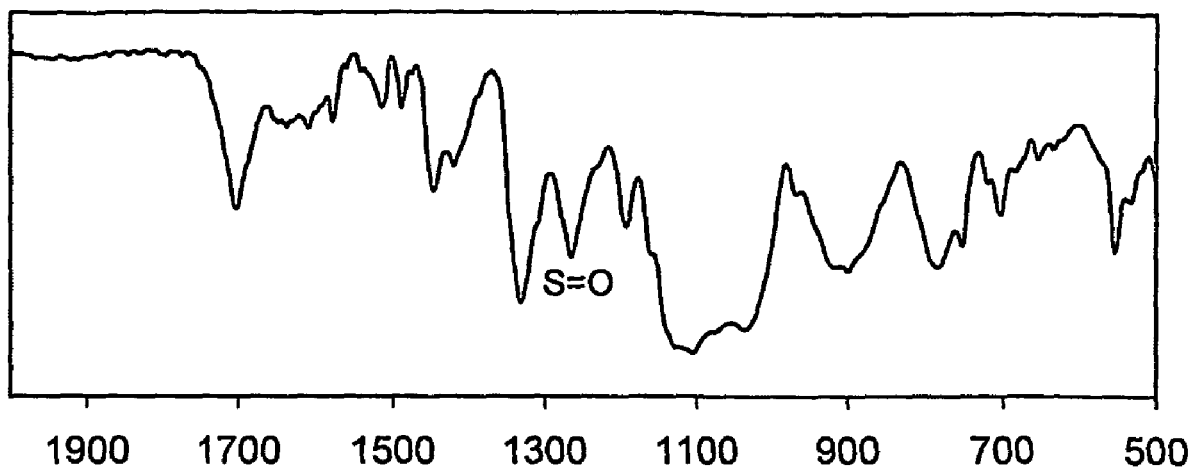
FIG. 14 shows an FTIR spectrum of OxImSSi.

FIG. 14 shows an FTIR spectrum of OxImSSi which showed that the peak of S=O group appeared at 1260 cm$^{-1}$.

Figure 15:
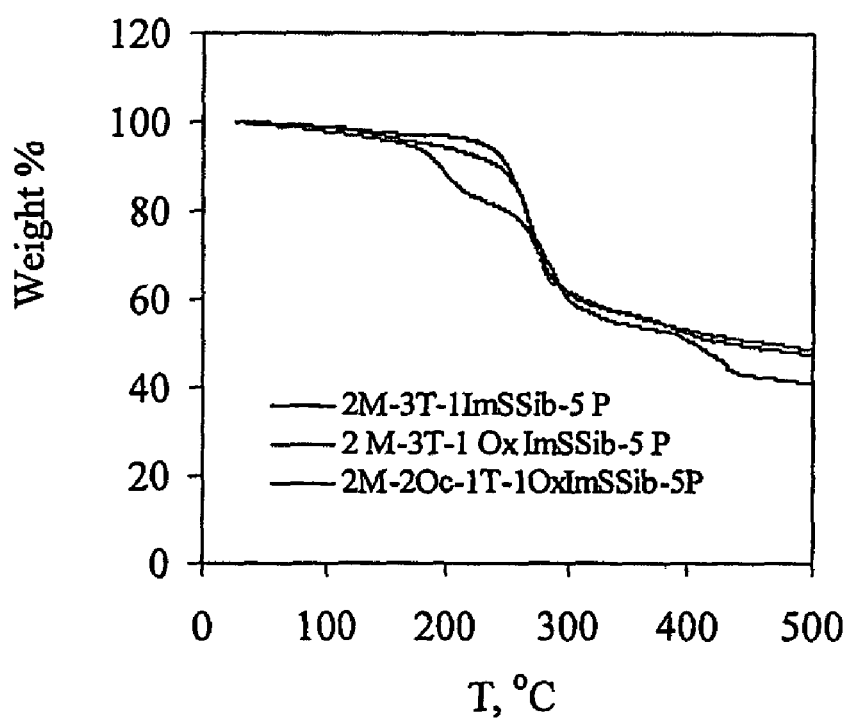
FIG. 15 shows TGA curves of the new membranes with OxImSSi compared with that with ImSSi, using a rate of 5° C./min in dry air.

Two membranes were fabricated using OxImSSi:
(1) 2 MDSPPO-3 TEOS-1 OxImSSi-5 $H_3PO_4$;
(2) 2 MDSPPO-2 BTESO-1 TEOS-1 OxImSSi-5 $H_3PO_4$;

FIG. 15 shows that the membrane with composition of 2 MDSPPO-3 TEOS-1 OxImSSi-5 $H_3PO_4$ started to lose weight quickly from 190° C., about 50° C. degree lower than that for the of membrane 2 MDSPPO-3 TEOS-1 ImSSi-5 $H_3PO_4$, indicating that the —SO$_2$— groups reduced the thermal stability of the membrane.

Figure 16:
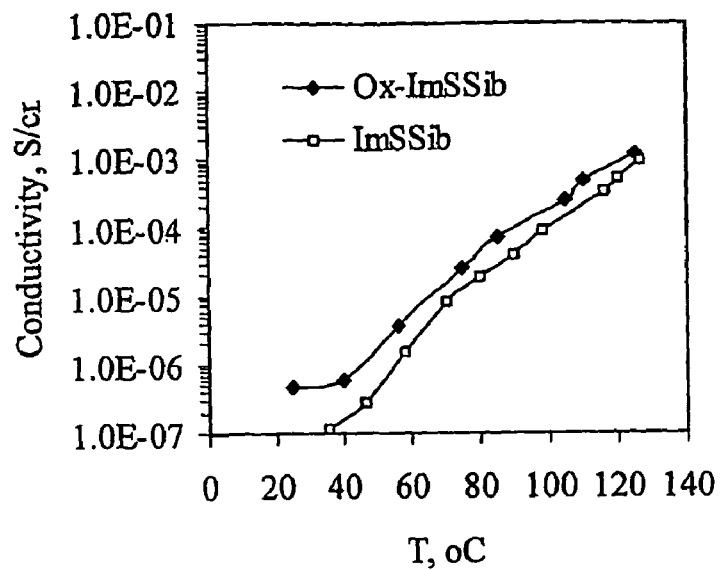
FIG. 16 shows proton conductivity of 2 MDSPPO-3 TEOS-1 OxImSSi-5 $H_3PO_4$ and 2 MDSPPO-3 TEOS-1 ImSSi-5 $H_3PO_4$ in anhydrous state.

FIG. 16 shows the proton conductivity of 2 MDSPPO-3 TEOS-1 OxImSSi-5 $H_3PO_4$ and 2 MDSPPO-3 TEOS-1 ImSSi-5 $H_3PO_4$ in anhydrous state. The membrane with composition of 2 MDSPPO-3 TEOS-1 OxImSSi-5 $H_3PO_4$ had a higher proton conductivity in the measured temperature range. The —SO$_2$— groups increased the acidity of imidazole rings, and thus enhanced the proton conductivity of the membranes.

Figure 17:
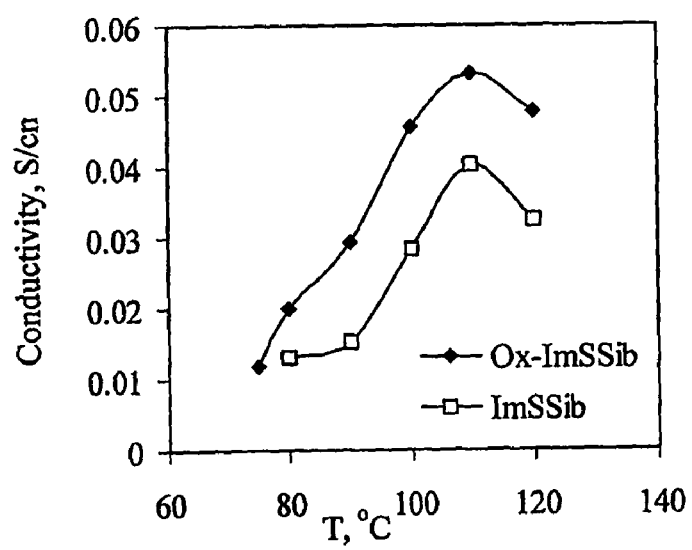
FIG. 17 shows proton conductivity of 2 MDSPPO-2 BTESO-1 TEOS-1 OxImSSi-5 $H_3PO_4$ and 2 MDSPPO-2 BTESO-1 TEOS-1 ImSSi-5 $H_3PO_4$ in the vapor of $MgCl_2$ saturated aqueous solution, the calculated relative humidity is about 26% at 80° C. and 22% at 100° C.

FIG. 17 shows proton conductivity of 2 MDSPPO-2 BTESO-1 TEOS-1 OxImSSi-5 $H_3PO_4$ and 2 MDSPPO-2 BTESQ-1 TEOS-1 ImSSi-5 $H_3PO_4$ in the vapor of $MgCl_2$ saturated aqueous solution, the calculated relative humidity is about 26% at 80° C. and 22% at 100° C. These data illustrate proton conductivity in low relative humidity environments. The membrane with composition of 2 MDSPPO-2 BTESO-1 TEOS-1 OxImSSi-5 $H_3PO_4$ had much higher proton conductivity than 2 MDSPPO-2 BTESO-1 TEOS-1 ImSSi-5 $H_3PO_4$, further confirming that the —SO$_2$— groups increased the acidity of imidazole rings.

Synthesis of New Hybrid Inorganic-orgamic Membranes with Grafted —SO$_3$H Groups and Imidazole Rings Membranes can be synthesized in which imidazole rings and acid groups are grafted on to a network. Acid groups can be organic acid groups (such as —COOH, and the like) or inorganic acid groups (such as —SO$_3$H, PO$_3$H$_2$, and the like)

Precursors can also be synthesized having grafted imidazole-ring terminated flexible chains, along with chains including —SO$_3$H groups, —PO$_3$H$_2$ groups, —COOH groups, and/or other acidic groups.

Figure 18:
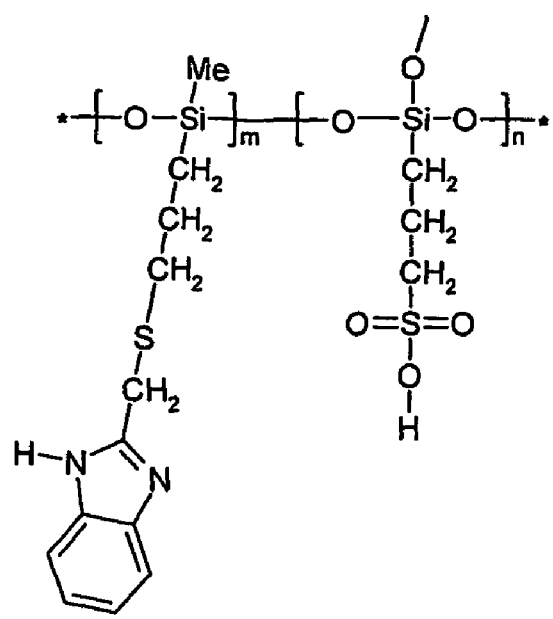
FIG. 18 shows the molecular structure of membranes grafting —$SO_3H$ and benzimidazole rings.

FIG. 18 shows the molecular structure of an example membrane with grafted —SO$_3$H and benzimidazole rings. The —SO$_3$H groups were added to achieve a higher proton conductivity in the anhydrous state.

A new membrane with a composition of 1MDSPPO-2BTESO-4TSPS-4BI was prepared through typical sol-gel process (TSPS: trihydroxysilylpropylsufonic acid, 30 wt % in water bought from Gelest). It was brittle in anhydrous state, but very flexible saturated with water.

Figure 19:
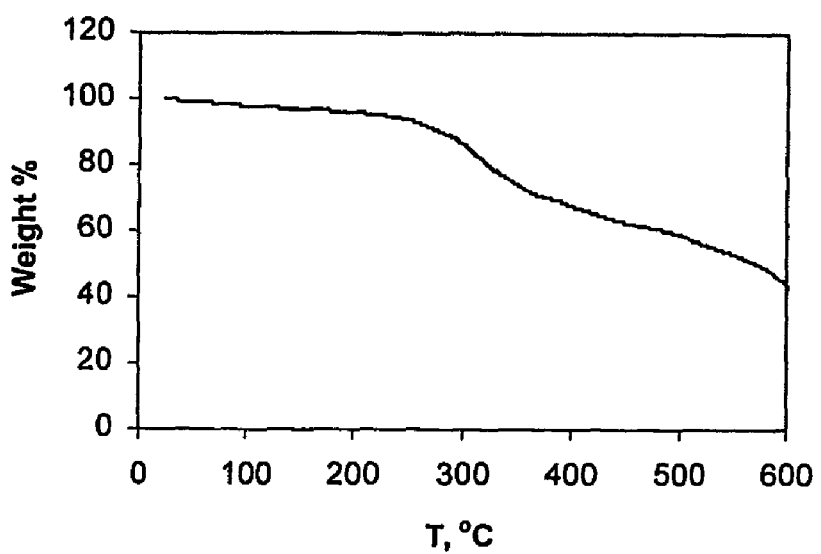
FIG. 19 shows a TGA curve measured in dry air with a heating rate of 5° C./min.

FIG. 19 shows a TGA curve measured in dry air with a heating rate of 5° C./min, showing that the membrane is thermally stable up to 300° C. in dry air. The proton conductivity in anhydrous state is less than 10$^{-6}$ S/cm from RT to 140° C. This can attributed to the strong basic property of benzimidazole rings.

The proton conductivity can be increased by substituting benzimidazole (BI) terminated chains with chains terminated with other heterocycles with much smaller Pka values. This will enhance the proton conductivity in anhydrous state.

Figure 20:
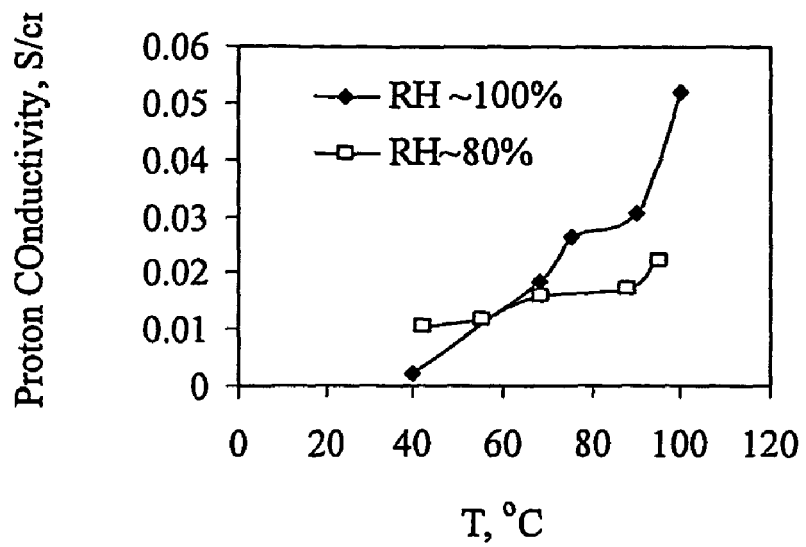
FIG. 20 shows proton conductivity of 1M-2Oc-4S-4B in environments with different relative humidity (RH)

FIG. 20 shows, however, the new membrane has very high proton conductivity in the hydrated state. Proton conductivity of 1M-2Oc-4S-4B is shown in environments with different relative humidity (RH). It is 0.05 S/cm at 100° C. in RH ~100%, comparable with Nafion 115.

Figure 21:
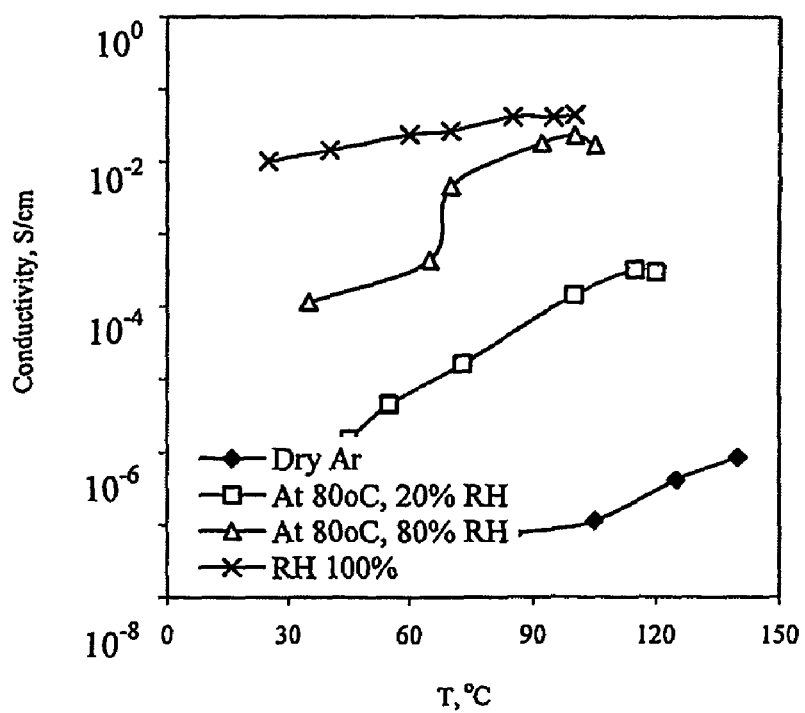
FIG. 21 shows proton conductivity dependence on relative humidity and temperature for the sample 2M-2Oc-4S-2BI.

FIG. 21 shows the proton conductivity dependence on RH and temperature of a sample 2M-2Oc-4S-2BI.

Two other membranes with compositions of 2MDSPPO-2BTESO-4TSPS-2BI and 1MDSPPO-2BTESO-2 TSPS-4BI have been prepared.

Other Examples

Imidazole rings have been attached to a hybrid inorganic-organic copolymer network through a flexible organic branch by simple and effective nucleophilic substitution reactions to provide improved proton conducting materials.

New membranes made from imidazole ring terminated alkoxysilane and $H_3PO_4$ had good mechanical properties and high proton conductivity in the anhydrous state and in low relative humidity, and can be thermally stable up to at least 190° C. The proton conductivities are over $10^{-2}$ S/cm under conditions with low relative humidity (<20%) above 100° C., indicating that they have great potential for application in high temperature PEM fuel cells and other electrochemical devices.

Proton electrolyte membranes (PEMs) described herein can be used in fuel cells, hydrogen separation/purification, reforming/partial oxidation of hydrocarbon fuels, contaminant removal, gas sensing, and other processes relevant to energy storage and conversion.

Other Precursor Examples

Improved proton-conducting membranes can be formed from precursors, as discussed in examples discussed above. A membrane can be formed by reacting a number of precursors, of different molecular structure, for example in a copolymerization reaction. Novel precursors according to the present invention include compounds of the general form:

where X is a terminal group, Y is a linking group, and Z is a reactive group.

Terminal Groups

Terminal groups can include a heterocycle, preferably a heterocycle including at least one atom that can provide a lone pair of electrons. Examples include nitrogen-containing heterocycles, such as nitrogen-containing heterocycles having two or more nitrogen atoms. Heterocycles include imidazole, and derivatives thereof.

In other examples, a heterocycle may include one or more nitrogen, sulfur and/or oxygen atoms, such as some combination of N, O, and/or S atoms. A heterocycle may be heteroaliphatic or heteroaromatic.

Terminal groups may also include halogenated heterocycles, for example fluorinated imidazoles. Examples of fluorinated imidazoles are described in U.S. Prov. App. Ser. No. 60/539,641, the entire content of which is incorporated herein by reference.

The terminal group may include one, two, three, or more interconnected connected and/or fused ring structures. If the terminal group contains more than one ring structure, one or more of the rings may be a heterocycle, such as a nitrogen-containing heterocycle. The terminal group may contain more than one heterocycle, which may have different structures.

Further examples of nitrogen containing heterocycles, which may be included in the terminal group of compounds according to the present invention, include benzimidazole, phenylimidazole (e.g. 2-phenylimidazole, PI), vinylimidazole, 2-methyl 4-ethyl imidazole, imidazole-2-carboxaldehyde, pyrazole, oxazole, carbazole, indole, isoindole, dihydrooxazole, isooxazole, thiazole, benzothiazole, isothiazole, benzimidazole, imidazolidine, indazole, 4,5-dihydropyrazole, 1,2,3-oxadiazole, furazane, 1,2,3-thiadiazole, 1,2,4-thiadiazole, 1,2,3-triazole, benzotriazole, 1,2,4-triazole, tetrazole, pyrrole, pyrrolidine, and pyrazole groups, and derivatives thereof.

In other examples, the terminal group may contain one or more atoms each providing a lone pairs of electrons, for example through one or more amino groups.

The terminal group may also include one or more substituents, such as an alkyl chain extending from a ring structure. Substituents can be included for various reasons, for example to adjust the electrochemical properties of the terminal group, improve mixing with other compounds, adjust thermal properties, and the like.

Linking Groups

Linking groups may include alkyl chains, such as alkyl chains having 1-20 carbon atoms (such as 2-5 carbon atoms) in one or more alkyl groups. The linking group may also include one or more aromatic rings, such as a benzene ring, or one or more atoms such as oxygen (for example, in an ether or ester linkage) or sulfur. The linking group preferably provides a degree of mobility to the terminal group when reactive group (or polymerizable group) Z is reacted to form a network, such as a polymer or sol-gel derived network.

Linking groups can include a sulfur atom, in particular if the precursor was synthesized by a nucleophilic substitution reaction between a thiol group and a halogen, for example between a compound including a halogen and a silane, and a compound including a thiol group and a heterocycle (or other terminal group).

Reactive Groups

The reactive group Z (for example a polymerizable group) includes groups that can be reacted (e.g. polymerized or copolymerized with one or more other precursors or other compounds) to form a network, such as a polymer. The reactive group may be a silane group, such as a trialkyloxysilyl group. The reactive group may also be a conventional monomer group, such as vinyl, acrylate, and the like. A material can be formed from a mixture of precursors having different reactive groups, for example to form an inorganic (from silane)—organic hybrid network, organic copolymer network, and the like. Alternatively, different precursors can be used with the same reactive group, but different terminal and/or linking groups.

Other Examples

Examples of precursors include silanes, such as trialkyloxysilanes of the form

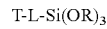

where T is a terminal group, L is a linking group, and where R is an alkyl group, hydrogen, or other substituent. The R groups may be the same or different. The nature of the alkoxy groups attached to the silicon atom may not have a significant effect on the final membrane.

A silane precursor may also have the form T-L-SiR$_x$(OR)$_{3-x}$, where R may be an alkyl group or other substituent.

In other examples, the linking group (with or without omission of the silane group) or the silane group may be connected to a polymer backbone, such as a polysiloxane, polycarbonate, polyether, polyester, or other polymer such as polymers described elsewhere in this specification, or known in the polymer chemistry art. A flexible linking group can be grafted onto a pre-existing polymer chain so as to flexibly attach the terminal group to the pre-existing polymer chain. For example, a pre-existing polymer may have sites to which one or more sidechains can be attached, the sidechains for example including a terminal group such as a nitrogen-containing heterocycle. A pre-existing polymer can be treated, for example with UV or ozone, to facilitate such a grafting process, for example as described in U.S. Prov. Pat. App. Ser. No. 60/473,812, filed May 28, 2003.

A proton-conducting membrane can also be formed by hydrolyzing a mixture of silane precursors to form a network comprising silicon atoms, with one or more heterocycles being flexibly attached to silicon atoms of the network. Acidic groups can also be attached to the network.

Hence, an improved proton conductive membrane comprises a network formed from copolymerization of at least a first silane and a second silane, the first silane comprising a first silane group, a terminal group, and a linking group connecting the terminal group to the first silane group, the first terminal group including an atom providing a lone pair of electrons. For example, the atom may be nitrogen, sulfur, or oxygen. The terminal group can be a heterocycle, for example a nitrogen containing heterocycle, such as a heterocycle having two nitrogen atoms, optionally non-adjacent atoms within the ring. The linking group can include a sulfur atom, for example if the precursor was formed in a nucleophilic reaction e.g. between a thiol containing compound and a halogen containing compound, One of the compounds including a silane group and the other the terminal group.

Preferably, the terminal group is flexibly attached to a silicon atom within the network. For example, a linking group may include at least two or three carbon atoms. Acid groups can also be attached to the network. The proton electrolyte membrane may further include free acid molecules, such as an inorganic acid (e.g. phosphoric acid) or an inorganic acid (e.g. carboxylic acid).

Membranes may be formed by copolymerization of one or more precursors according to the present invention, with or without other compounds present. For example, a proton-conducting membrane can be formed by copolymerization of a first precursor including a first reactive group, a first linking group, and a first terminal group, with a second precursor including a second reactive group, a second linking group, and a second terminal group. For example, the first terminal group may provide one, two, or more atoms providing a lone pair of electrons, for example a nitrogen-containing heterocycle. The second terminal group may provide an acid group, for example as described below. The first and second reactive groups may be trialkyloxysilanes, so that the copolymerization may be a sol-gel process.

The silane group of the precursors include silane groups of the form —Si(OR$_1$)(OR$_2$)(OR$_3$), where R$_1$, R$_2$, and R$_3$ each represent an alkyl group or a hydrogen atom, such as trialkyloxysilyl groups. Other substituents can be used in place of the alkyl groups, such as alkenyl groups. In other examples, one or more alkyloxy groups may be replaced with alkyl groups.

In other examples, silane-containing precursors according to the present invention can be grafted to a thermoplastic polymer, the grafted polymer then being involved in a sol-gel reaction, for example with other silanes such as alkyloxysilanes or other silane precursors discussed herein.

Acid Groups

Acid group species can also be attached to the network, for example, inorganic acid groups such as sulfonic acid group (—SO$_3$H), phosphoric acid groups (—PO$_3$H), boronic acid (—B(OH)$_2$), and the like, and/or organic acid groups such as a carboxylic acid groups (—COOH). In certain environments, the dissociable proton may be replaced by another ion, such as an alkali metal ion, other metal ion, ammonium ion, or the like.

Other species that can be attached to the network include amide groups, such as bissulfonylamide groups.

Applications

Proton conducting materials can be used as membranes in fuel cells. A fuel cell according to the present invention includes a positive electrode, a negative electrode, and a proton-conducting membrane formed from proton conducting materials described elsewhere.

The dimensions of the membrane will be determined by the configuration of the fuel cell, as is well known. Proton conducting materials can be produced in a form suitable for use as a membrane without further processing, or formed as a tape or sheet that can be cut to a desired shape, or further processed. Proton conducting materials can include or be disposed on one or more reinforcing sheets, such as a web material.

For example, a thermally stable material, for example in the form of a web or grid, may be included within a membrane or on its surface so as to improve the mechanical properties of the membrane. For example, a Nafion grid may be included to reduce membrane brittleness.

Hence, an example fuel cell according to the present invention includes a positive electrode, a negative electrode, and a membrane therebetween formed from a proton conducting material described herein.

Proton electrolyte membranes (PEMs) or other forms of the polymer conducting materials described herein can be used in fuel cells, hydrogen separation/purification, reforming/partial oxidation of hydrocarbon fuels, contaminant removal, gas sensing, and other processes relevant to energy storage and conversion.

Optional Modifications

Proton conducting materials according to the present invention can further include particles such as metal-containing particles (such as nanometer-sized hygroscopic metal oxides), polymers dispersed through the membrane for improved mechanical properties, main-chain polymers having electron lone pair providing atoms within the main chain, acid-group substituted polymers (such as polymers including inorganic acid groups such as —H$_3$PO$_4$) and dopants such as proton-conductive inorganic compounds, such as Zr(HPO$_4$)$_2$.H$_2$O, silicotungstic acid (SiO$_2$.12WO$_3$.26H$_2$O), other compounds including acid groups (such as inorganic acids such as —SO$_3$H, —PO$_3$H$_2$), groups such as —SO$_2$NHSO$_2$CF$_3$, and —CF$_2$SO$_2$NHSO$_2$CF$_3$, inorganic salts such as CsHSO$_4$, and acid salts such as $Zr(HPO_4)_2$. Other proton sources and proton solvents can also be included.

In other examples, additional organosilanes, such as two or more flexibly interconnected silane groups, for example two silane groups interconnected through an alkyl chain having 2-20 carbon atoms, can be used in preparation of the membrane, for example to improve mechanical properties. For example, bisalkyloxysilyl terminated polymers (including oligomers), and/or short organic chains can be used, for example silanes of the form $Si(A_{3-x}B_x)$—R—$Si(A_{3-x}B_x)$, where A can be an alkyloxy group, hydrogen, or other substituent, and B can be an alkyl group, and where R is a flexible chain. Examples of flexible chains include polypropylene oxide, polytetraethylene oxide, poly(1-butene), polyethylene, polypropylene, polyvinylidene fluoride, polystyrene, polytetrafluoroethylene, polyvinylchloride, and polyvinylalcohol. Hence, examples include bis(alkyloxysilyl)-terminated polymer compounds. Other examples of flexible chains include straight chain alkyl groups with 2-20 carbon atoms, other chains comprising carbon, hydrogen, and optionally oxygen, and other chains.

Proton conducting materials according to the present invention can further comprise small molecules analogous to the terminal groups discussed above in relation to silane precursors, such as imidazole and its derivatives (including 2-ethyl, 4-methylimidazole and benzimidazole), or other nitrogen-containing heterocycles and their derivatives. Such compounds can be added to improve the proton conductivity of the materials.

The resistance of a membrane to water induced degradation can be increased by including insoluble acid salts in the membrane, such as cesium hydrogen sulphate ($CsHSO_4$) or cesium hydrogen phosphate ($CsH_2PO_4$).

Membranes formed from materials according to the present invention may further include polymer fibers, such as Nafion fibers, to improve properties such as mechanical properties. These fibers need not be chemically bonded to the remainder of an inorganic-organic hybrid network.

Acid groups can be bound to the network by including acid-group including silanes in a sol-gel reaction. Examples include PETHS ($PO(OH)_2$—$C2H_4$—$Si(OH)_3$, phosphoryl ethyl trihydroxyl silane, and alkyloxy analogs), acid-substituted phenyl trialkyloxy silanes (such as SPS ($Si(EtO)_3$-Ph-$SO_2OH$), and the like.

Patents, publications, and provisional patent applications mentioned in this specification are herein incorporated by reference to the same extent as if each individual publication was specifically and individually indicated to be incorporated by reference. In particular, the provisional application of a similar title to Li et al., filed May 28, 2003, is incorporated herein in its entirety.

The invention is not restricted to the illustrative examples described above. Examples are not intended as limitations on the scope of the invention. Changes therein, other combinations of elements, and other uses will occur to those skilled in the art. The scope of the invention is defined by the scope of the claims.

Having described our invention, we claim:

1. A proton-conducting material including a copolymerization product of at least a first silane and a second silane,
   the first silane comprising a first silane group, a terminal group, and a linking group connecting the terminal group to the first silane group,
   the terminal group including at least one atom providing a lone pair of electrons,
   the proton-conducting material being a proton-conducting membrane,
   the terminal group including an aromatic heterocycle having at least one atom selected from a group consisting of oxygen, nitrogen, and sulfur,
   the linking group including a sulfoxy group.

2. The proton-conducting material of claim 1, wherein the aromatic heterocycle is a nitrogen-containing heterocycle.

3. The proton-conducting material of claim 2, wherein the nitrogen-containing heterocycle is imidazole, so that the terminal group includes an imidazole ring.

4. The proton-conducting material of claim 1, wherein the terminal group includes a benzimidazole group.

5. The proton-conducting material of claim 1, wherein the sulfoxy group includes a sulfur atom bound to a carbon atom of the aromatic heterocycle.

6. The proton-conducting material of claim 1, wherein the linking group includes at least one aromatic ring.

7. The proton-conducting material of claim 1, wherein the first silane or the second silane includes an acid group.

8. The proton-conducting material of claim 1, wherein the second silane is a tetraalkyloxysilane.

9. The proton-conducting material of claim 1, wherein the second silane is a bisalkyloxysilyl terminated organic polymer.

10. A fuel cell including:
    a first electrode;
    a second electrode; and
    a proton-conducting membrane located between the first electrode and the second electrode,
    the proton-conducting membrane including a proton-conducting material,
    the proton-conducting material comprising a material formed from the copolymerization of at least three silanes, including a first silane, a second silane, and a third silane,
    the first silane comprising a first silane group, a terminal group, and a linking group connecting the terminal group to the first silane group,
    the terminal group including at least one atom providing a lone pair of electrons
    the terminal group of the first silane including an imidazole ring,
    the second silane being a tetraalkoxysilane, and
    the third silane including a flexible organic chain.

11. The fuel cell of claim 10, wherein the first silane has a structure represented by:

where $R_1$, $R_2$, and $R_3$ represent an alkyl group, alkoxy group, hydroxyl group, or a hydrogen atom, wherein $R_1$, $R_2$, and $R_3$ are the same or different,
L represents the linking group,
and Z represents the terminal group, the terminal group including the imidazole ring.

12. The fuel cell of claim 10, wherein the proton-conducting membrane further includes free inorganic acid molecules.

13. A proton-conducting material, comprising
a polymer network, including silicon atoms and oxygen atoms; and
organic side-chains attached to silicon atoms within the polymer network,
each organic side-chain comprising a linking group and a terminal group, the linking group connecting the terminal group to a silicon atom of the polymer network,
the terminal group including a heterocycle, the heterocycle including at least one atom chosen from a group consisting of nitrogen, oxygen, and sulfur,
the heterocycle being an aromatic heterocycle, the polymer network being an inorganic-organic hybrid polymer network, the proton-conducting material being a proton-conducting membrane, the linking group including a sulfoxy group.

14. The proton-conducting material of claim 13, wherein the aromatic heterocycle is imidazole, so that the terminal group includes an imidazole ring.

15. The proton-conducting material of claim 13, wherein the terminal group includes a benzimidazole group.

16. The proton-conducting material of claim 13, wherein the sulfoxy group includes a sulfur atom bound to a carbon atom of the aromatic heterocycle.

17. The proton-conducting material of claim 13, wherein the linking group includes at least one aromatic ring.

18. The proton-conducting material of claim 13, further comprising acid groups bound to the polymer network.

19. The proton-conducting material of claim 13, wherein the hybrid inorganic-organic polymer network is formed by a sol-gel copolymerization reaction of a plurality of silane precursors.

20. The proton-conducting material of claim 13, further comprising free inorganic acid molecules.

21. A fuel cell including:
a first electrode;
a second electrode; and
a proton-conducting membrane located between the first electrode and the second electrode,
the proton-conducting membrane including the proton-conducting material of claim 13.

22. A process for preparing a silane compound, the process comprising:
providing a first compound, including a terminal group and a first reactive group, the terminal group including a heterocycle including at least one atom selected from a group consisting of nitrogen, oxygen, and sulfur;
providing a second compound, including a silane group and a second reactive group;
providing a reaction between the first reactive group and the second reactive group so as to prepare the silane compound, the silane compound having the terminal group connected to the silane group through a linking group,
the reaction being between a halogen atom and a thiol group, so that the linking group of the silane compound includes a sulfur atom, and
the process further including oxidizing the sulfur atom so that the linking group includes sulfoxy group.

23. The process of claim 22, wherein the heterocycle is an aromatic nitrogen-containing heterocycle.

24. The process of claim 23, wherein the terminal group includes an imidazole ring.

25. The process of claim 24, wherein the terminal group includes a benzimidazole group, the benzimidazole group including the imidazole ring.

26. The process of claim 23, wherein the linking group of the silane compound further includes at least one aromatic ring.

27. A silane compound, the silane compound comprising:
a silane group, the silane group being hydrolyzable,
a linking group, connected to the silane group, and
a terminal group, attached to the linking group so that the linking group interconnects the silane group and the terminal group,
the terminal group including an aromatic nitrogen-containing heterocycle,
the linking group including a sulfoxy group.

28. The silane compound of claim 27, wherein the terminal group includes an imidazole ring.

29. The silane compound of claim 28, wherein a sulfur atom of the sulfoxy group is directly attached to a carbon atom of the aromatic nitrogen-containing heterocycle.

30. The silane compound of claim 28, wherein the linking group includes at least one aromatic ring.

31. The silane compound of claim 27, wherein the terminal group includes a benzimidazole group.

32. A proton-conducting material including a copolymerization product of at least a first precursor and a second precursor,
the first precursor including:
a first polymerizable group,
a linking group, and
a terminal group, the terminal group being connected to the first polymerizable group through the linking group, the terminal group including an aromatic nitrogen-containing heterocycle; and
the second precursor, having a second polymerizable group,
the proton-conducting material being a proton-conducting membrane, and
the linking group including a sulfoxy group.

33. The proton-conducting membrane of claim 32, wherein the terminal group includes an imidazole ring.

34. The proton-conducting membrane of claim 32, a sulfur atom of the sulfoxy group being directly attached to a carbon atom of the aromatic nitrogen-containing heterocycle.

35. The proton-conducting membrane of claim 32, wherein the second precursor includes an acid group.

36. The proton-conducting membrane of claim 32, wherein the first polymerizable group and the second polymerizable groups are both silanes, the copolymerization being a sol-gel reaction.

* * * * *